United States Patent
Wang et al.

(10) Patent No.: US 10,344,691 B2
(45) Date of Patent: Jul. 9, 2019

(54) ROBUST LOW PRESSURE EXHAUST GAS RECIRCULATION SYSTEM CONTROL FOR A TURBOCHARGED GASOLINE ENGINE

(71) Applicants: Shu Wang, Rochester Hills, MI (US); William P Attard, Brighton, MI (US); David Lawrence, Lake Orion, MI (US); Ethan E Bayer, Lake Orion, MI (US); Tyler Tutton, Royal Oak, MI (US)

(72) Inventors: Shu Wang, Rochester Hills, MI (US); William P Attard, Brighton, MI (US); David Lawrence, Lake Orion, MI (US); Ethan E Bayer, Lake Orion, MI (US); Tyler Tutton, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 11 days.

(21) Appl. No.: 15/800,395

(22) Filed: Nov. 1, 2017

(65) Prior Publication Data

US 2019/0128196 A1   May 2, 2019

(51) Int. Cl.
*F02M 26/28* (2016.01)
*F02D 41/00* (2006.01)
*F02M 26/47* (2016.01)
*F02M 26/02* (2016.01)
*F02M 26/00* (2016.01)

(52) U.S. Cl.
CPC ..... *F02D 41/0077* (2013.01); *F02D 41/0072* (2013.01); *F02M 26/02* (2016.02); *F02M 26/28* (2016.02); *F02M 26/47* (2016.02); *F02M 2026/003* (2016.02)

(58) Field of Classification Search
CPC . F02D 41/0077; F02D 41/0072; F02M 26/47; F02M 26/02; F02M 26/48; F02M 26/06; F02M 26/08; F02M 2026/003
See application file for complete search history.

(56) References Cited

U.S. PATENT DOCUMENTS

| | | | |
|---|---|---|---|
| 2013/0139795 A1* | 6/2013 | Saitoh | F02M 26/49 123/568.16 |
| 2014/0251287 A1* | 9/2014 | Takezoe | F02D 41/0052 123/568.11 |
| 2014/0311450 A1* | 10/2014 | Minami | F02P 5/045 123/406.46 |

(Continued)

*Primary Examiner* — George C Jin
(74) *Attorney, Agent, or Firm* — Ralph E. Smith

(57) ABSTRACT

Systems and methods for a turbocharged gasoline engine utilize a controller configured to receive a set of parameters including a measured pressure delta across an exhaust gas recirculation (EGR) valve disposed in a low pressure EGR (LPEGR) system of the engine and a measured pressure at an outlet of a differential pressure (dP) valve disposed in and distinct from a throttle valve of an induction system of the engine. The controller is further configured to determine a set of modeled pressures based on the set of parameters, a target EGR valve mass flow, a target EGR valve delta pressure, a current dP valve mass flow, and a pressure at an outlet of the air filter, determine target positions for the EGR valve and the dP valve based on the set of modeled pressures, and control the EGR valve and the dP valve based on their respective target positions.

18 Claims, 17 Drawing Sheets

(56) References Cited

U.S. PATENT DOCUMENTS

2015/0260116 A1* 9/2015 Odello .............. F02D 41/0072
  123/568.11
2017/0314483 A1* 11/2017 Brewbaker ......... F02D 41/0072
2017/0363032 A1* 12/2017 Rodgers ................ F02M 26/05

* cited by examiner

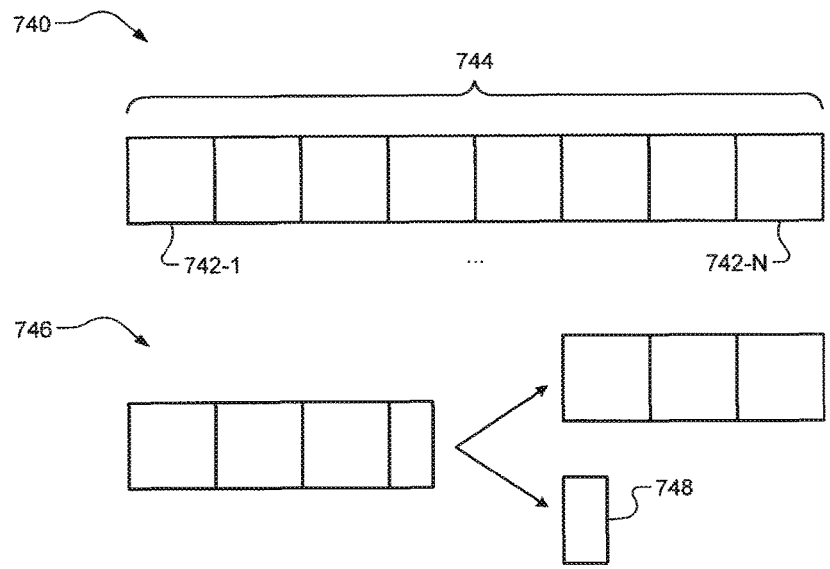
FIG. 7C
FIG. 7D
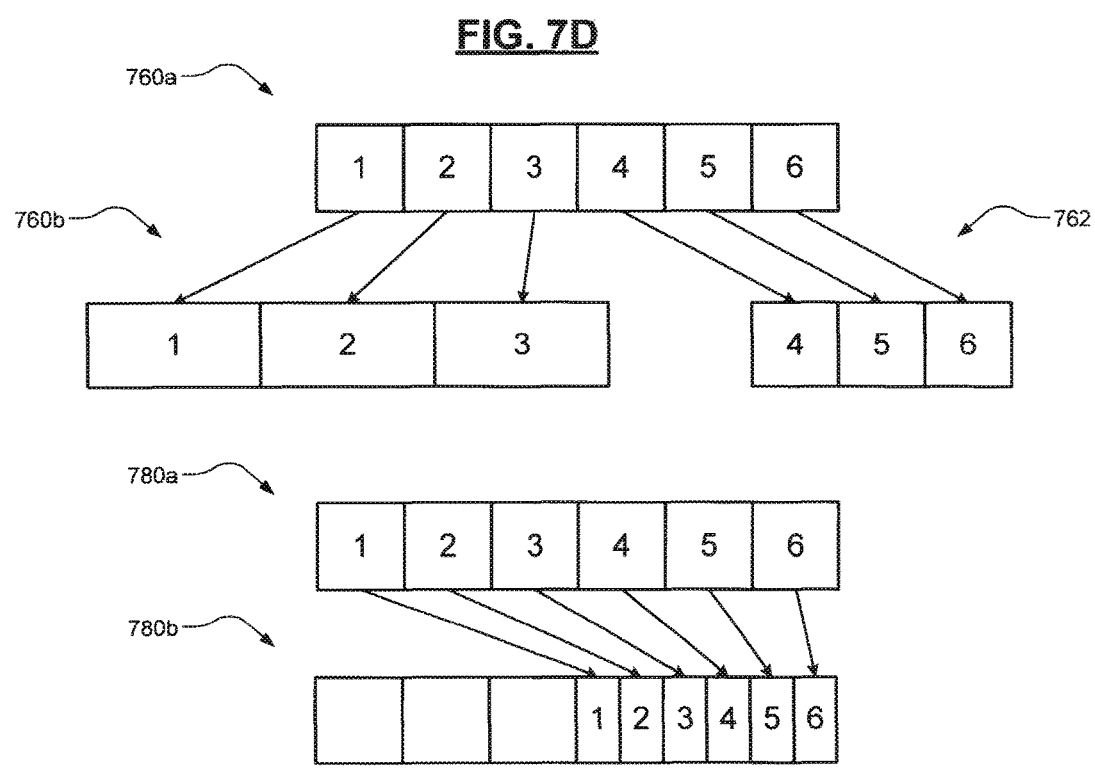

ROBUST LOW PRESSURE EXHAUST GAS RECIRCULATION SYSTEM CONTROL FOR A TURBOCHARGED GASOLINE ENGINE

FIELD

The present application generally relates to exhaust gas recirculation (EGR) and, more particularly, to robust control techniques for a low pressure EGR (LPEGR) system for a turbocharged gasoline engine.

BACKGROUND

A turbocharged engine utilizes a compressor of a turbocharger to force air through an induction system and a throttle valve and into an intake manifold. The air is combined with fuel and combusted within cylinders, and exhaust gas resulting from combustion is expelled from the cylinders into an exhaust system. The kinetic energy of the exhaust gas drives a turbine of the turbocharger, which in turn drives the compressor. The engine could also include a low pressure exhaust gas recirculation (LPEGR) system that recirculates exhaust gas from downstream of the turbine and a catalytic converter to upstream of the compressor. The portion of recirculated exhaust gas is regulated by an EGR valve. The EGR and throttle valves require accurate, coordinated control. This typically requires a large quantity of sensors, which is expensive. Accordingly, while such turbocharged engine systems work well for their intended purpose, there remains a need for improvement in the relevant art.

SUMMARY

According to one example aspect of the invention, a control system for a vehicle including a gasoline engine and a turbocharger is presented. In one exemplary implementation, the control system comprises: an exhaust gas recirculation (EGR) valve disposed in a low pressure EGR (LPEGR) system of the engine and configured to control a flow of exhaust gas produced by the engine from an exhaust system of the engine at a first point downstream from a turbine of the turbocharger to an induction system of the engine at a second point upstream from a compressor of the turbocharger and a throttle valve and downstream from an air filter; a differential pressure (dP) valve disposed in the induction system of the engine at a third point upstream from the second point and configured to control a flow of air through the induction system; and a controller configured to: receive a set of parameters including a measured pressure delta across the EGR valve and a measured pressure at an outlet of the dP valve; determine a set of modeled pressures based on the set of parameters, a target EGR valve mass flow, a target EGR valve delta pressure, a current dP valve mass flow, and a pressure at an outlet of the air filter; determine target positions for the EGR valve and the dP valve based on the set of modeled pressures; and control the EGR valve and the dP valve based on their respective target positions.

In some implementations, the controller is further configured to: determine one of the set of modeled pressures including a modeled pressure at an inlet of the EGR valve based on the target EGR valve mass flow and the current dP valve mass flow, respectively; determine a modeled pressure at an outlet of the EGR valve based on the modeled EGR valve inlet pressure and the measured EGR valve delta pressure; determine an estimated open-loop EGR valve position based on the target EGR valve mass flow and the modeled EGR valve inlet and outlet pressures; determine the target position for the EGR valve based on the estimated open-loop EGR valve position; and control the EGR valve based on the target EGR valve position, the target EGR valve mass flow, and the estimated EGR valve mass flow. In some implementations, the controller is configured to perform closed-loop control of the EGR valve by adjusting the target EGR valve position based on a difference between the estimated EGR valve mass flow and the target EGR valve mass flow.

In some implementations, the controller is further configured to: determine a target dP valve outlet pressure based on hardware pressure limits, a measured barometric pressure from the set of parameters, the modeled EGR valve inlet pressure, and the target EGR valve delta pressure; determine a target dP valve delta pressure based on a difference between the air filter outlet pressure and the target dP valve outlet pressure; determine the target position for the dP valve based on the target dP valve delta pressure and the current dP valve mass flow; and control the dP valve based on the target dP valve position, the target dP valve outlet pressure, and the measured dP valve outlet pressure. In some implementations, the controller configured to perform closed-loop control of the dP valve by adjusting the target dP valve position based on a difference between the measured dP valve outlet pressure and the target dP valve outlet pressure.

In some implementations, the controller is configured to determine the target EGR mass flow by: determining a current EGR valve position; determining an EGR valve mass flow rate based on the current EGR valve position, the measured EGR valve delta pressure, and the measured dP valve outlet pressure; receiving a measured exhaust gas concentration, the measured exhaust gas concentration being one of the set of parameters; and utilizing an EGR transport delay model, the EGR valve mass flow rate, and the measured exhaust gas concentration, determining an intake port fuel fraction and compressor inlet, throttle inlet, and intake port EGR fractions. In some implementations, the controller is further configured to control the engine based on the intake port fuel fraction and the compressor inlet, throttle inlet, and intake port EGR fractions.

In some implementations, the set of modeled pressures include an EGR pickup pressure at the first point, a pressure at an inlet of the EGR valve, and the air filter outlet pressure, and wherein the controller is further configured to perform long term adaptation to the modeled EGR pickup pressure, both short term and long term adaptation to the EGR valve inlet pressure, long term adaptation to the air filter outlet pressure, and short term adaptation to the measured dP valve outlet pressure. In some implementations, the engine further comprises: first and second turbochargers having (i) first and second compressors each disposed downstream from the dP valve and the dP valve outlet pressure sensor, the throttle valve being disposed downstream from the first and second compressors, and (ii) first and second turbines configured to drive the first and second compressors, respectively, using the exhaust gas; a first exhaust treatment system disposed downstream from the first turbine; a second exhaust treatment system disposed downstream from the second turbine, the second exhaust treatment system comprising a catalytic converter and an exhaust gas concentration sensor; an EGR cooler in the LPEGR system disposed downstream from the catalytic converter and upstream from the EGR valve, the EGR cooler being configured to cool the exhaust gas, and an EGR pressure delta sensor in the LPEGR system disposed proximate to the EGR valve and configured to measure the EGR valve delta pressure.

According to another example aspect of the invention, a gasoline engine system for a vehicle is presented. In one exemplary implementation, the system comprises: an induction system configured to provide air to an engine, the induction system comprising: an air filter, a differential pressure (dP) valve disposed downstream from the air filter, a dP outlet pressure sensor disposed at an outlet of the dP valve, first and second compressors disposed downstream from the dP valve and the dP outlet pressure sensor, and a throttle valve disposed downstream from the first and second compressors; an exhaust system configured to receive exhaust gas produced by the engine, the exhaust system comprising: first and second turbines configured to drive the first and second compressors, respectively, using the exhaust gas, a first exhaust treatment system disposed downstream from the first turbine, a second exhaust treatment system disposed downstream from the second turbine, the second exhaust treatment system comprising a catalytic converter and an exhaust gas concentration sensor, and a low pressure exhaust gas recirculation (LPEGR) system configured to recirculate the exhaust gas to the induction system, the LPEGR system comprising: an EGR cooler disposed downstream from the catalytic converter and configured to cool the exhaust gas, an EGR valve configured to control recirculation of the cooled exhaust gas from the EGR cooler to a point upstream from the first and second compressors and downstream from the dP valve and the dP valve outlet pressure sensor, and an EGR pressure delta sensor disposed proximate to the EGR valve and configured to measure a delta pressure across the EGR valve; and a controller comprising a barometric pressure sensor configured to measure barometric pressure, the controller being configured to: receive, from the EGR pressure delta sensor, the measured pressure delta across the EGR valve, receive, from the dP outlet pressure sensor, the measured pressure at the outlet of the dP valve, determine a set of modeled pressures based on (i) a set of parameters including the measured EGR valve pressure delta the measured dP valve outlet pressure, (ii) a target EGR valve mass flow, (iii) a target EGR valve delta pressure, (iv) a current dP valve mass flow, and (v) a pressure at an outlet of the air filter, determine target positions for the EGR valve and the dP valve based on the set of modeled pressures, and control the EGR valve and the dP valve based on their respective target positions.

In some implementations, the controller is further configured to: determine one of the set of modeled pressures including a modeled pressure at an inlet of the EGR valve based on the target EGR valve mass flow and the current dP valve mass flow, respectively; determine a modeled pressure at an outlet of the EGR valve based on the modeled EGR valve inlet pressure and the measured EGR valve delta pressure; determine an estimated open-loop EGR valve position based on the target EGR valve mass flow and the modeled EGR valve inlet and outlet pressures; determine the target position for the EGR valve based on the estimated open-loop EGR valve position; and control the EGR valve based on the target EGR valve position, the target EGR valve mass flow, and the estimated EGR valve mass flow. In some implementations, the controller is configured to perform closed-loop control of the EGR valve by adjusting the target EGR valve position based on a difference between the estimated EGR valve mass flow and the target EGR valve mass flow.

In some implementations, the controller is further configured to: determine a target dP valve outlet pressure based on hardware pressure limits, the measured barometric pressure, the modeled EGR valve inlet pressure, and the target EGR valve delta pressure, the measured barometric pressure being one of the set of parameters; determine a target dP valve delta pressure based on a difference between the air filter outlet pressure and the target dP valve outlet pressure; determine the target position for the dP valve based on the target dP valve delta pressure and the current dP valve mass flow; and control the dP valve based on the target dP valve position, the target dP valve outlet pressure, and the measured dP valve outlet pressure. In some implementations, the controller is configured to perform closed-loop control of the dP valve by adjusting the target dP valve position based on a difference between the measured dP valve outlet pressure and the target dP valve outlet pressure.

In some implementations, the controller is configured to determine the target EGR mass flow by: determining a current EGR valve position; determining an EGR valve mass flow rate based on the current EGR valve position, the measured EGR valve delta pressure, and the measured dP valve outlet pressure; receiving, from the exhaust gas concentration sensor, the measured exhaust gas concentration, the measured exhaust gas concentration being one of the set of parameters; and utilizing an EGR transport delay model, the EGR valve mass flow rate, and the measured exhaust gas concentration, determining an intake port fuel fraction and compressor inlet, throttle inlet, and intake port EGR fractions. In some implementations, the controller is further configured to control the engine based on the intake port fuel fraction and the compressor inlet, throttle inlet, and intake port EGR fractions.

In some implementations, the set of modeled pressures include an EGR pickup pressure before the EGR cooler, a pressure at an inlet of the EGR valve, and the air filter outlet pressure. In some implementations, the controller is further configured to perform long term adaptation to the modeled EGR pickup pressure, both short term and long term adaptation to the EGR valve inlet pressure, long term adaptation to the air filter outlet pressure, and short term adaptation to the measured dP valve outlet pressure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 5A-5F are functional block diagrams of example gas pressure adaptation architectures of the controller of the vehicle according to the principles of the present disclosure;

FIGS. 7A-7D are diagrams of example exhaust gas constituent tracking features according to the principles of the present disclosure.

DETAILED DESCRIPTION

Figure 1:
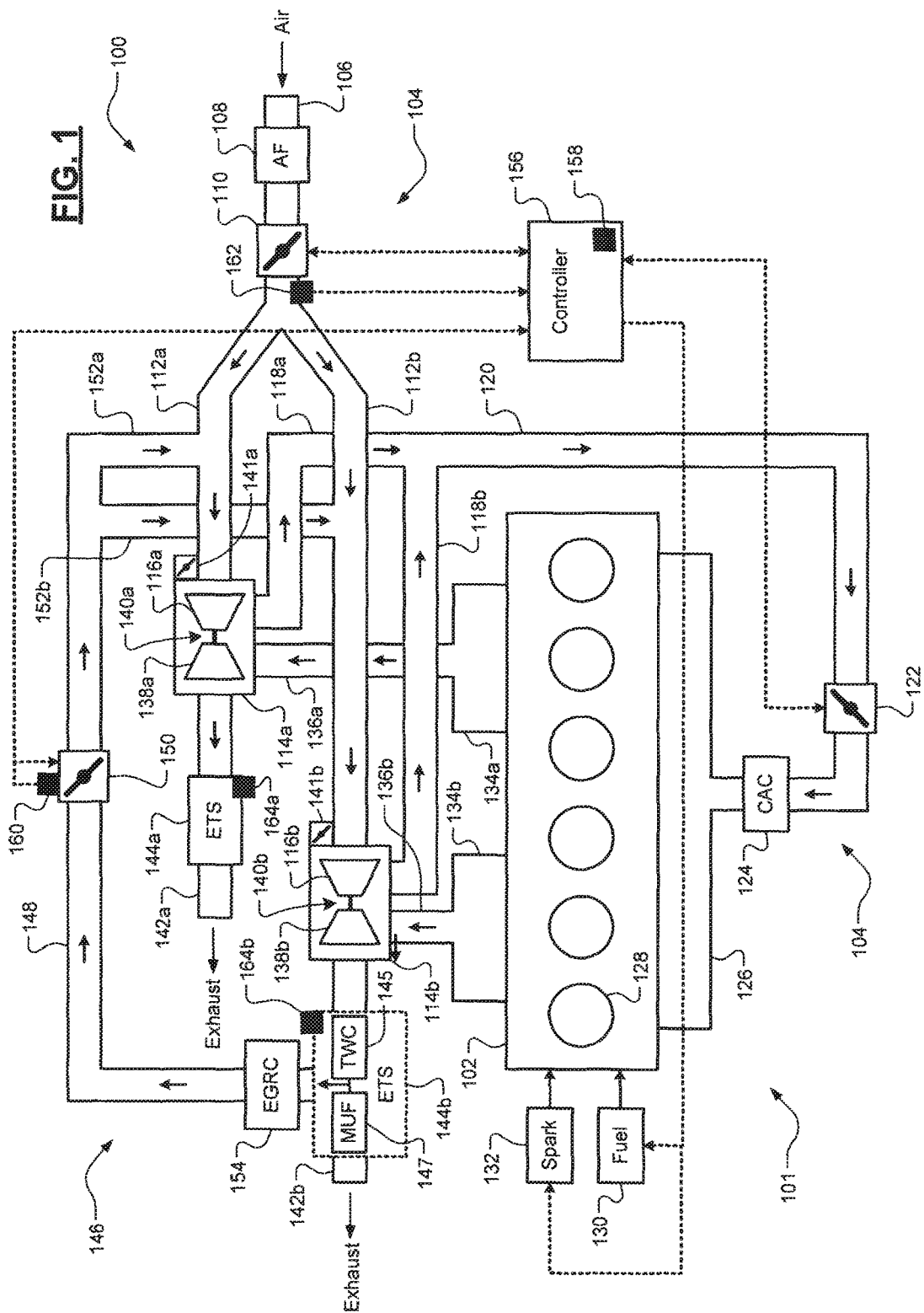
FIG. 1 is a diagram of an example vehicle according to the principles of the present disclosure.
Figure 2:
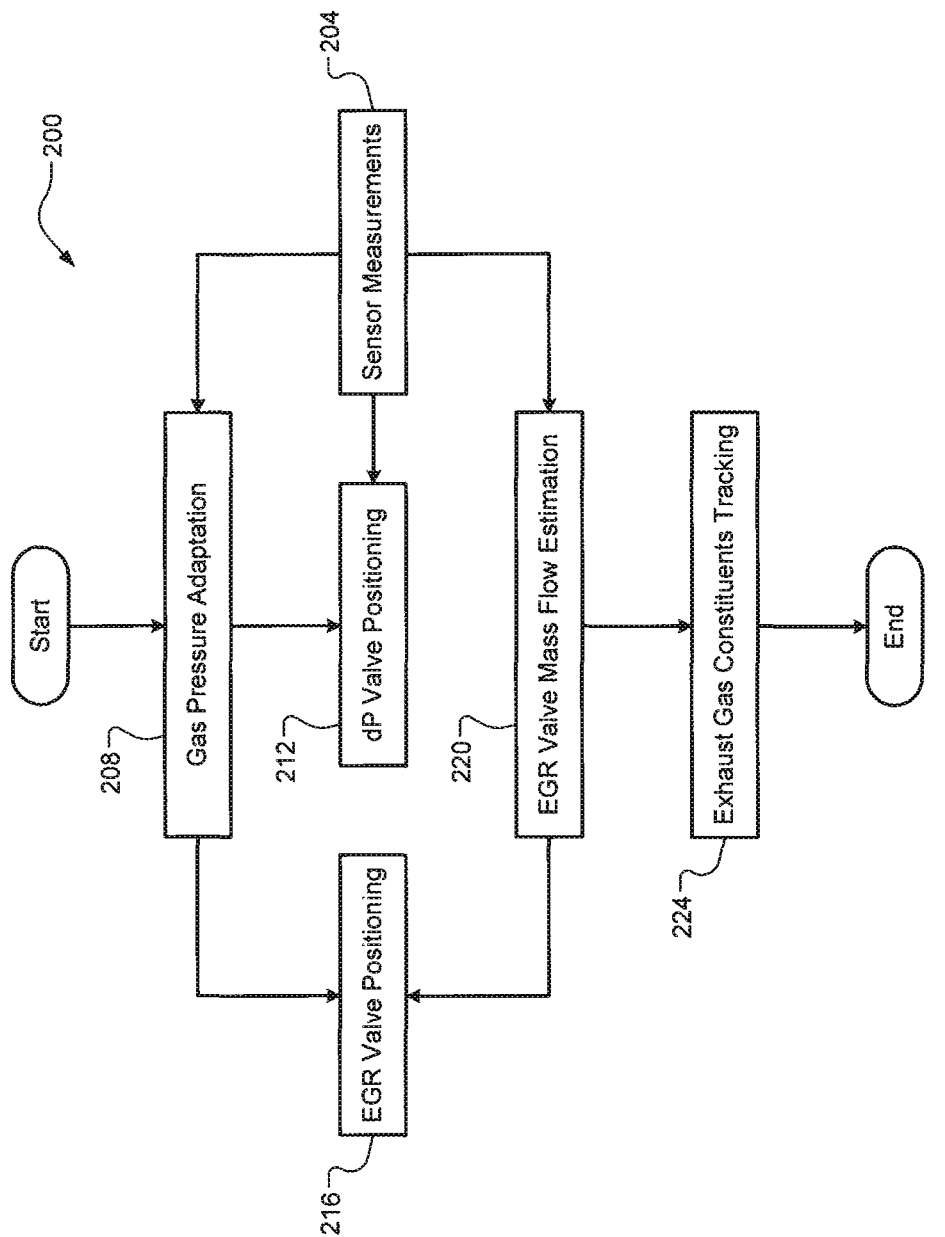
FIG. 2 is a flow diagram of an example engine control method according to the principles of the present disclosure.

As previously discussed, low pressure exhaust gas recirculation (LPEGR) systems comprise an EGR valve that must be precisely controlled in conjunction with a throttle valve of an engine. These LPEGR systems recirculate low pressure exhaust gas from a point downstream from a turbine and a catalytic converter. In contrast to traditional high pressure EGR systems, a minor fluctuation of a few kilopascals (kPa) could cause significant changes in EGR flow, EGR control error, and noise/vibration/harshness (NVH) in an LPEGR system. While conventional diesel engines often utilize LPEGR systems, diesel engines control torque output via fuel control. Compression ignition of air and diesel fuel is also entirely different than spark ignition of air and gasoline fuel. Diesel engines, for example, utilize EGR for nitrogen oxide (NOx) reduction, whereas gasoline engines utilize EGR for pumping loss and knock/auto-ignition reduction. Also, diesel engines are always lean burn and have a much wider air/fuel ratio (FAR) range, so the EGR accuracy for diesel engines is less critical. Gasoline engines, on the other hand, require a precise FAR for the combustible air/fuel mixture (e.g., within a very precise range). In addition, gasoline engines require that the FAR of the exhaust gas is at stoichiometric so that a three-way catalytic converter is able to achieve its best emission conversion efficiency. For at least these reasons, the EGR fraction control and estimation is critical for gasoline engines. Inaccurate EGR control and estimation could cause a significant reduction in fuel economy and potential significant engine hardware failure.

Aside from the hardware differences between high pressure EGR (HPEGR) and LPEGR systems, the engine operation conditions between the two are also different. HPEGR is used under low load to mid load conditions because the EGR valve upstream pressure (exhaust pressure) is higher than the intake manifold pressure, so there is enough differential pressure across the EGR valve to drive EGR into the intake manifold. However, under full/high load conditions and for boosted applications, the intake manifold pressure is too high for EGR to be forced into it. As mentioned above, LPEGR is somewhat common for diesel engines because (i) diesel engines run under boost conditions most of the time, (ii) there is no need to HPEGR under low load conditions (no pumping loss reduction necessary), and (iii) the EGR control and estimation accuracy requirement is low or non-existent. LPEGR is uncommon or unpopular on gasoline engines, on the other hand, because (i) naturally aspirated engines don't require LPEGR, (ii) LPEGR control accuracy is difficult to achieve, (iii) there are potential NVH issues (exhaust noise delivered into the induction system, as described above), and (iv) it is difficult to deliver enough EGR to the intake manifold under low load to mid load engine operating conditions.

Utilizing sensors throughout the LPEGR system would allow for more accurate control, but implementing additional sensors increases costs. Conventional pressure models are also not adaptable in that they are able to adjust themselves over time (e.g., due to component aging, part-to-part variability, changes due to ambient conditions, etc.). Additionally, because the flow path of the LPEGR system is much longer than a high pressure EGR system, there is a substantial delay between controlling the EGR valve to when the recirculated exhaust gas reaches the intake port of the engine. For example, a high pressure EGR system could include a short flow path from the exhaust manifold to the intake manifold, whereas the LPEGR system may have a very long flow path from downstream of a catalytic converter all the way back to further upstream in the induction system (e.g., before a compressor). Thus, the exhaust gas constituents (inert gas (the combusted mixture, e.g., $CO_2$ and $H2O$), hydrocarbons, etc.) must be accurately tracked throughout the flow path. It is less critical for high pressure EGR systems to accurately track exhaust gas constituents because of their much shorter flow path. Similarly, diesel engines do not need to accurately track exhaust gas constituents because these are primarily utilized for spark control, which does not occur in diesel engines. Utilizing a plurality of exhaust gas concentration sensors throughout the flow path would allow for accurate monitoring, but these sensors are expensive. In addition, transient response and accuracy under dynamic pressure conditions are issues for wide-range oxygen (WRO2) sensors, which are used to monitor EGR concentrations throughout the flow path.

Accordingly, an improved control system for a turbocharged gasoline engine with an LPEGR system is presented. A differential pressure (dP) valve is implemented downstream of an air filter and upstream from the compressor and the LPEGR port. This dP valve is controlled to maintain enough differential pressure across the EGR valve to deliver a desired EGR mass flow under a wide range of engine operating conditions. Another benefit of the dP sensor is mitigating or eliminating the NVH that could occur in LPEGR systems as the EGR path can be construed to be an exhaust leak when EGR is flowing and hence can attenuate exhaust noise out through the induction system (e.g., through an airbox). Only three pressure sensors and one exhaust gas concentration sensor are required by the LPEGR control system: a dP valve outlet pressure sensor, an EGR valve delta pressure sensor, a barometric pressure sensor, and an exhaust gas concentration sensor (e.g., a WRO2 sensor in the exhaust) associated with the LPEGR system. Other important pressures are modeled and short term and/or long term adaptation is applied to various measured/modeled pressures (to account for catalytic converter aging, air filter clogging, etc.). The exhaust gas constituents are also tracked through the LPEGR flow path and utilized for engine control. More particularly, when the EGR valve is closed, there is still exhaust gas flowing through the induction side of the LPEGR path, and by accurately tracking the exhaust gas constituents, fuel and spark of the engine are precisely controlled, e.g., to avoid potential misfires. Long-term sensor adaptation, e.g., of the exhaust WRO2 sensor, also improves trapped air flow and torque estimation and open-loop air/fuel ratio delivery.

Referring now to FIG. 1, an example engine system 101 for a vehicle or vehicle powertrain 100 is illustrated. The engine system 101 includes a gasoline engine 102 that receives air from an induction system 104. An induction path 106 receives fresh air that is filtered by an air filter (AF) 108. A dP valve 110 regulates the flow of air through the induction path 106 and a pressure in induction paths 112a, 112b. Turbochargers 114a, 114b comprise compressors 116a, 116b ("compressors 116") that force air/exhaust gas from the induction paths 112a, 112b through induction paths 118a, 118b that converge into a single induction path 120. While two turbochargers 114a and 114b are shown, it will be appreciated that the engine system 101 could have only one turbocharger. A throttle valve 122 regulates the flow of air/exhaust gas through an optional charge air cooler (CAC) 124 and into an intake manifold 126. It will be appreciated that the throttle 122 could be implemented downstream from the CAC 124. The air/exhaust gas in the intake manifold 126 is provided to a plurality of cylinders 128, combined with gasoline from fuel injectors 130 and combusted by spark from spark plugs 132 to drive pistons (not shown) that generate drive torque to propel the vehicle 100. While six cylinders are shown, it will be appreciated that the engine 102 could include any suitable number of cylinders.

Exhaust gas resulting from combustion is expelled from the cylinders 128 into exhaust manifolds 134a, 134b. Each exhaust manifold 134a, 134b, for example, could be associated with three of the six cylinders 128. The exhaust gas in exhaust manifold 134a flows through exhaust path 136a and its kinetic energy drives a turbine 138a of turbocharger 114a. The turbine 138a drives compressor 116a via a shaft 140a. Similarly, the exhaust gas in exhaust manifold 134b flows through exhaust path 136b and its kinetic energy drives a turbine 138b of turbocharger 114b, which in turn drives compressor 116b via a shaft 1401). Wastegate valves 141a, 141b regulate turbocharger speed/boost pressure. The exhaust gas flows from turbines 138a, 138b through exhaust paths 142a, 142b and is treated by exhaust treatment systems (ETS) 144a, 144b to decrease or eliminate emissions before being released into the atmosphere. ETS 144b is shown to include a three-way catalytic converter (TWC) 145 and a muffler (MUF) 147. It will be appreciated that each ETS 144a, 144b could include other exhaust treatment components.

An LPEGR system 146 recirculates exhaust gas from an EGR pickup point between the catalytic converter 145 and the muffler 147 through an EGR path 148 that is regulated by an EGR valve 150. The EGR path 148 splits into separate EGR paths 152a, 152b which direct the exhaust gas to ports in induction paths 112a, 112b downstream of the dP valve 110 and upstream of the compressors 116a, 116b. The LPEGR system 146 includes an EGR cooler (EGRC) 154 that cools the exhaust gas. Because turbocharged gasoline engines operate at very high temperatures, cooling of the recirculated exhaust gas provides for increased performance. A controller 156 controls operation of the engine system 101. It will be appreciated that the term "controller" as used herein refers to any suitable control device or set of multiple control devices that is/are configured to perform at least a portion of the techniques of the present disclosure. Non-limiting examples include an application-specific integrated circuit (ASIC) and one or more processors and a non-transitory memory having instructions stored thereon that, when executed by the one or more processors cause the controller to perform a set of operations. The one or more processors could be either a single processor or two or more processors operating in a parallel or distributed architecture.

The controller 156 includes a barometric pressure sensor 158 that measures barometric pressure. It will be appreciated that the barometric sensor 158 could be external to the controller 156. An EGR valve delta pressure sensor 160 is disposed proximate to the EGR valve 150 and measures a delta pressure across the EGR valve 150. A dP valve outlet pressure sensor 162 measures a pressure at an outlet of the dP valve 110. This dP valve outlet pressure also corresponds to inlet pressures of the compressors 116a, 116b. Lastly, exhaust gas concentration sensors 164a, 164b measure exhaust gas concentration. However, only exhaust gas concentration sensor 164b is required for the techniques of the present disclosure because it is associated with the LPEGR system 146. In one exemplary implementation, the exhaust gas concentration sensors 164a, 164b are WRO2 sensors configured to measure an air/fuel ratio (FA) of the exhaust gas. It will be appreciated that the engine system 101 could include other suitable sensors, such as an exhaust gas or back pressure sensor (not shown). All of these sensors provide their measurements to the controller 156, e.g., via a controller area network (CAN).

EGR Valve and dP Valve Control

Figure 3A:
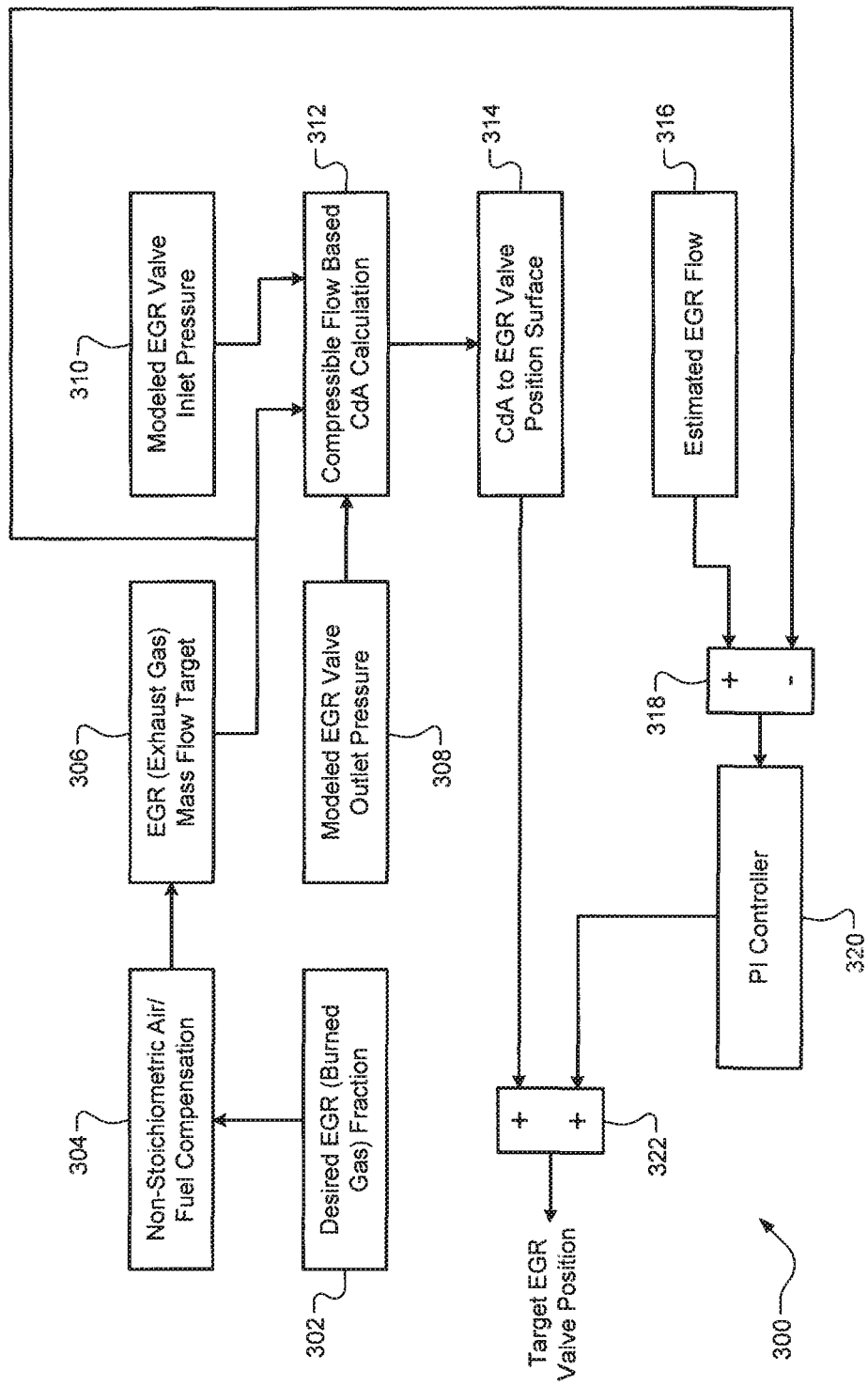
FIGS. 3A-3C are functional block diagrams of example exhaust gas recirculation (EGR) valve control, differential pressure (dP) valve control, and EGR valve mass flow and EGR/fuel fraction estimation architectures of a controller of the vehicle according to the principles of the present disclosure.
Figure 3B:
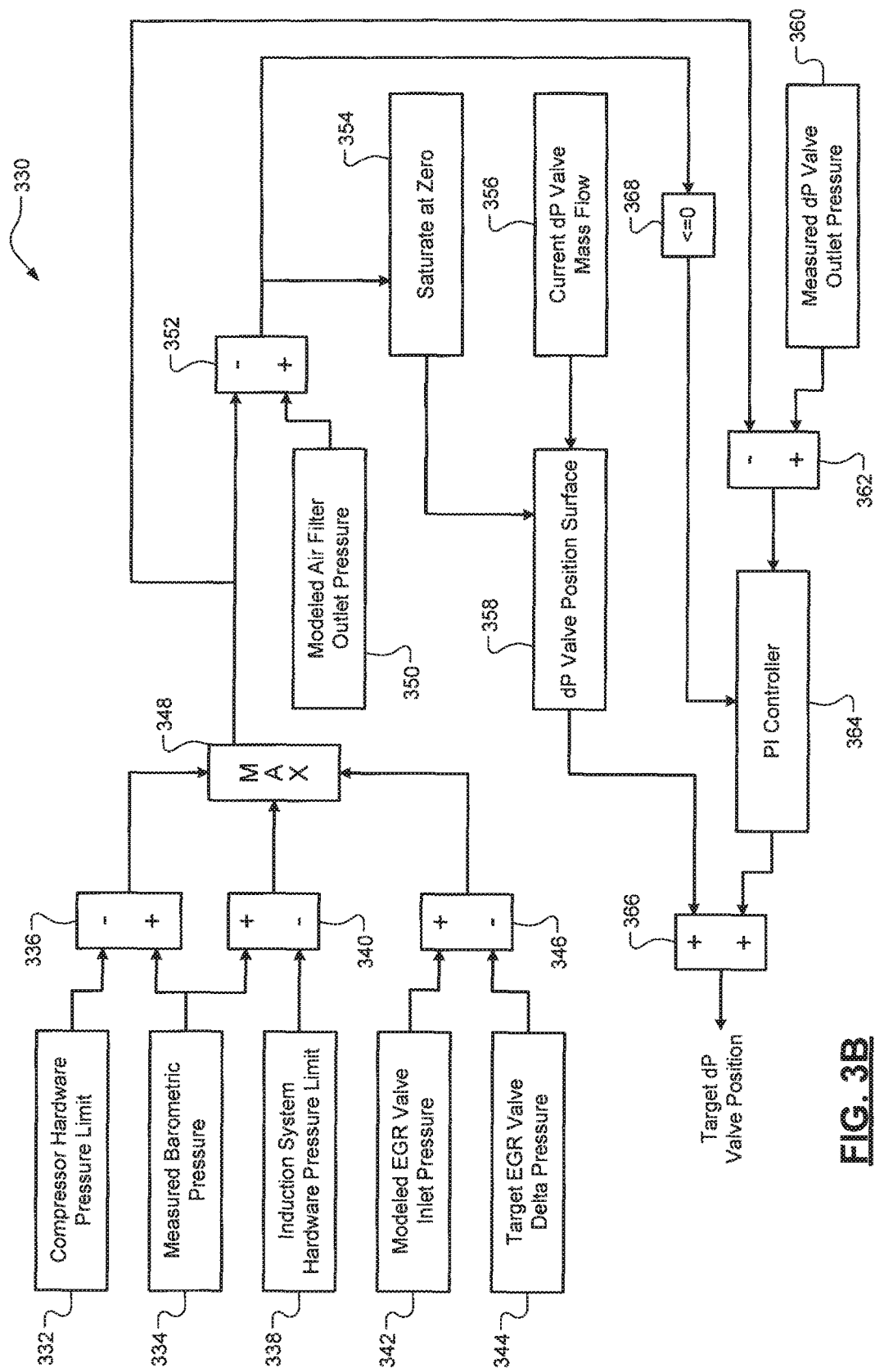
Figure 3C:
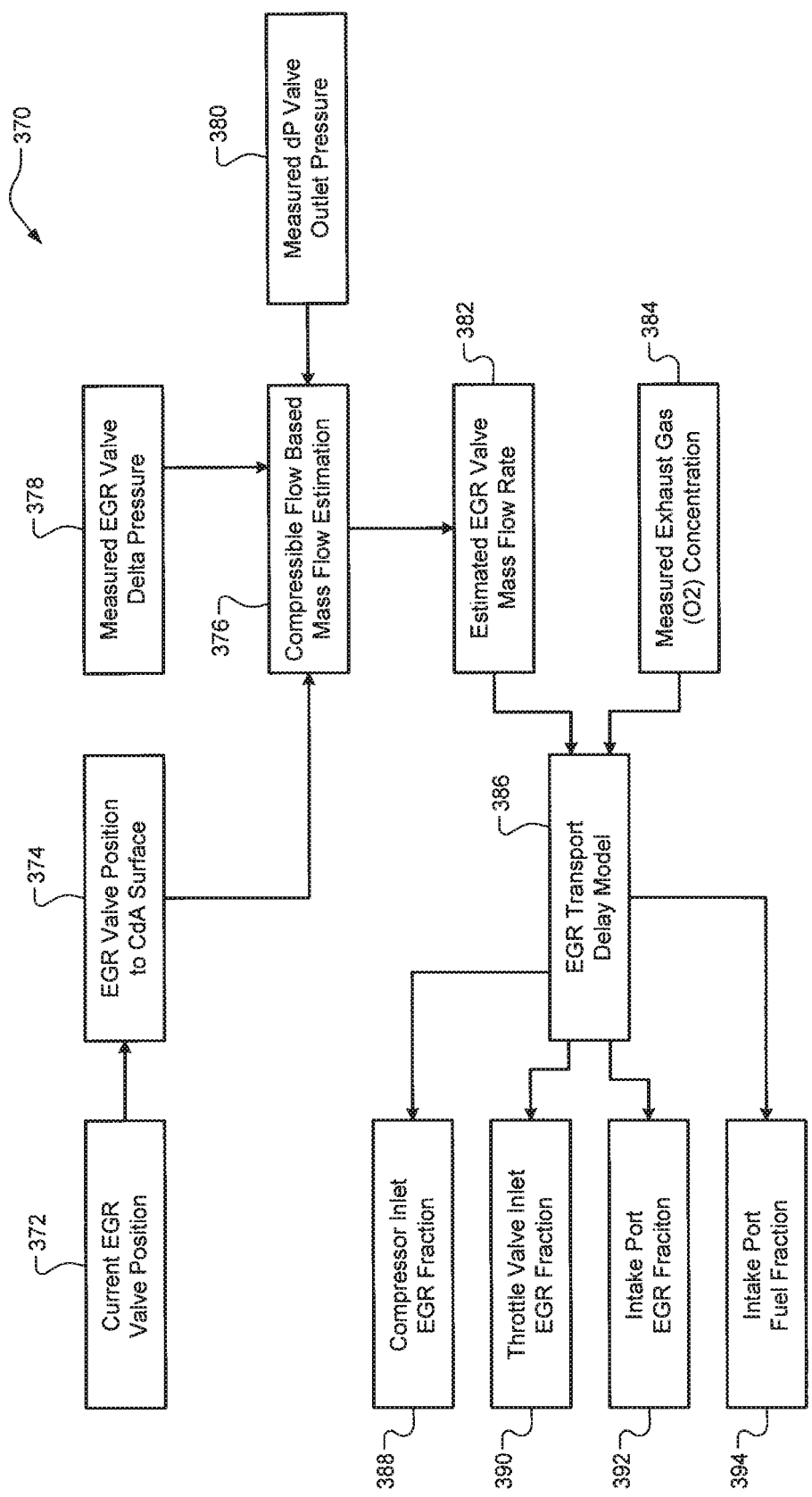

Referring now to FIGS. 3A-3C, functional block diagrams of example EGR valve control, dP valve control, and EGR valve mass flow and EGR/fuel fraction estimation architectures are illustrated. In one exemplary implementation, these architectures are implemented in the controller 156.

In FIG. 3A, an example EGR valve position control architecture 300 is illustrated. Block 302 determines a desired EGR (or burned gas) fraction for the engine 102. Block 304 compensates the desired EGR fraction for a non-stoichiometric air/fuel ratio. Block 306 determines a target EGR mass flow. Blocks 308 and 310 model EGR valve inlet and outlet pressures, respectively. The outputs of blocks 306, 308, and 310 are fed to block 312 that calculates a target effective flow area (CdA) for the EGR valve 150 based on a compressible flow method. Block 314 utilizes a one-dimensional surface to convert the calculated CdA to a target EGR valve position. Closed-loop adjustment of the target EGR valve position is performed based on a difference between the target EGR mass flow (from block 306) and an estimated EGR flow from block 316. This difference output by block 318 is run through a proportional-integral (PI) controller 320 and the output is the adjustment to the target EGR valve position at block 322.

In FIG. 3B, an example dP valve position control architecture 330 is illustrated. Differences are calculated between compressor and induction system hardware pressure limits and measured barometric pressure (from barometric pressure sensor 158) at blocks 332-340. Another difference is calculated between the modeled EGR valve inlet pressure and a target EGR valve delta pressure (e.g., to meet NVH goals or constraints) at blocks 342-346. Each of these differences is fed to block 348, which outputs the maximum of the three differences as a target dP valve outlet pressure. As previously discussed herein, the target dP valve outlet pressure is also the target compressor inlet pressure. Another difference is calculated between the modeled air filter outlet pressure and the target dP valve outlet pressure at blocks 350-352. This difference is a target dP valve delta pressure. The target dP valve delta pressure is saturated at zero at block 354. Block 358 utilizes a two-dimensional surface to determine a target dP valve position based on the saturated target dP valve delta pressure and a current dP valve mass flow (from block 356). Closed-loop adjustment of the target dP valve position is performed based on a difference between a measured dP valve outlet pressure from block 360 (measured by the dP valve outlet pressure sensor 162) and the target dP valve outlet pressure (from block 348). This difference output by block 362 is run through a proportional-integral (PI) controller 364 and the output is the adjustment to the target dP valve position at block 366. Additionally, when the target dP valve delta pressure falls below zero, a reset signal for the PI controller block 364 (e.g., reset to zero) is generated by block 368.

In FIG. 3C, an example EGR valve mass flow and EGR/fuel fraction estimation architecture 370 is illustrated. Block 372 outputs the current EGR valve position. Block 374 utilizes one-dimensional surface to convert the current EGR valve position to a current effective flow area (CdA) for the EGR valve 150. Block 376 receives the output of block 374, the measured EGR valve delta pressure (measured by the EGR valve delta pressure sensor 160) from block 378, and the measured dP valve outlet pressure (measured by the dP valve outlet pressure sensor 162) from block 380. Block 376 performs a compressible flow based estimation of the current EGR valve mass flow. Block 382 receives the output of block 376 and estimates the current EGR valve mass flow rate. The output of block 382 and a measured exhaust gas (e.g., O2) concentration (measured by exhaust gas concentration sensor 164b) from block 384 are fed to an EGR transport delay model block 386. Block 386 utilizes an EGR transport delay model, which models the flow of EGR through the LPEGR system 146 and takes into account the associated delay, along with the other inputs to model each of a compressor inlet EGR fraction (block 388), a throttle valve inlet EGR fraction (block 390), an intake port EGR fraction (block 392), and an intake port fuel fraction (block 394). Each of these modeled parameters is then utilized in controlling operation of the engine 102 (e.g., fuel and/or spark).

Figure 4:
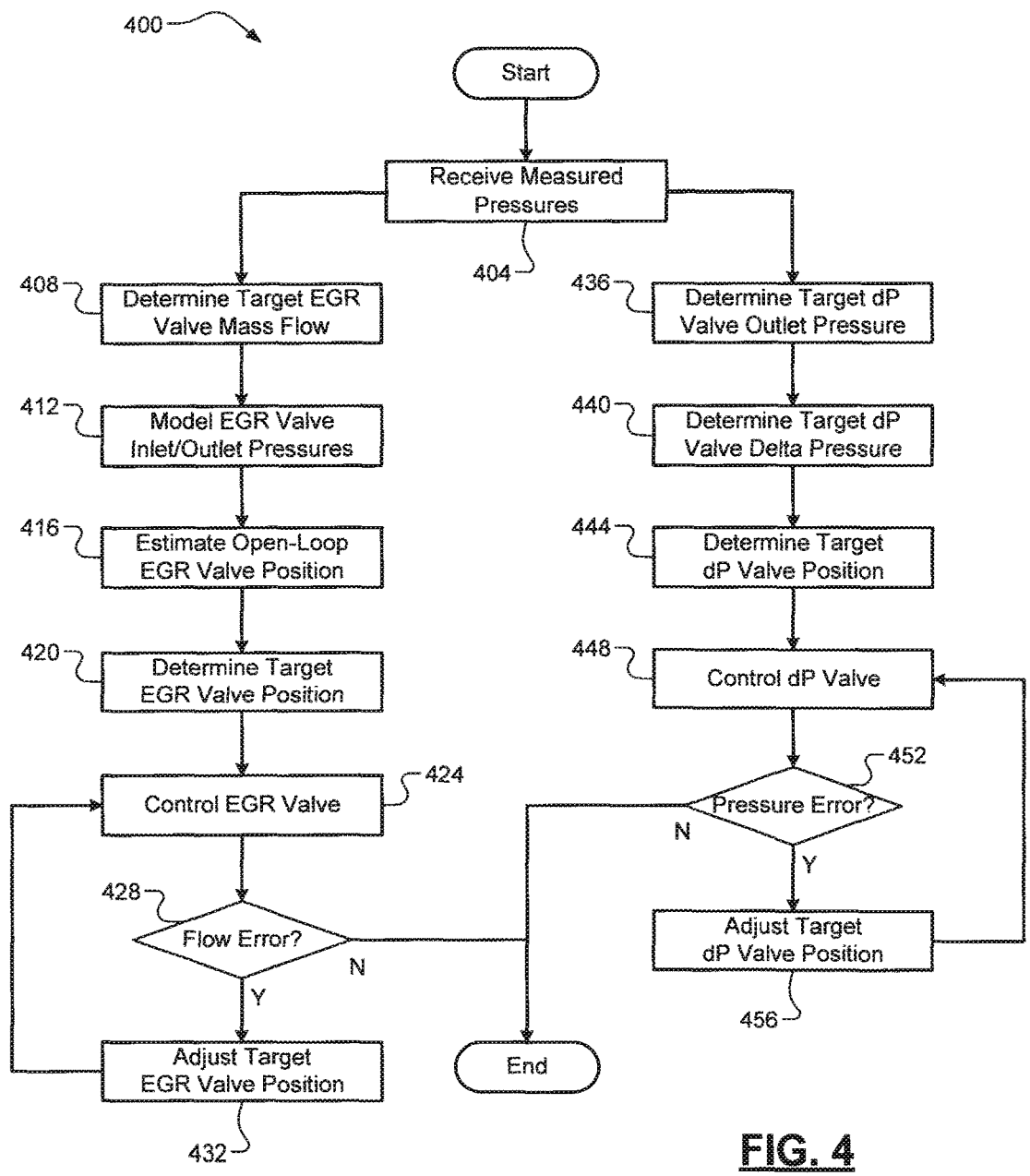
FIG. 4 is a flow diagram of an example EGR valve and dP valve control method according to the principles of the present disclosure.

Referring now to FIG. 4, a flow diagram of an example method 400 of controlling the EGR valve 150 and the dP valve 110 is illustrated. At 404, the controller 156 receives a set of measured pressures. In one exemplary implementation, these measured pressures include EGR valve delta pressure, dP valve outlet pressure, and barometric pressure. From 408, the method 400 splits into two coordinated control loops, one for each of the EGR valve 150 and the dP valve 110. At 408, the controller 156 determines the target EGR valve mass flow. At 412, the controller 156 models the EGR valve inlet/outlet pressures based on the target EGR valve mass flow and the measured EGR valve delta pressure. At 416, the controller 156 estimates an open-loop EGR valve position based on the target EGR mass flow and the modeled EGR valve inlet/outlet pressures. At 420, the controller 156 determines the target EGR valve position based on the estimated open-loop EGR valve position. At 424, the controller 156 controls the EGR valve 150 based on the target EGR valve position. This includes closed-loop adjustment of the target EGR valve position at 432 based on a difference or error between the target EGR valve mass flow and the estimated EGR valve mass flow, which is compared to a threshold at 428. When the error satisfies the threshold, the method 400 ends or returns to 404. At 436, the controller 156 determines the target dP valve outlet pressure. At 440, the controller 156 determines the target dP valve delta pressure based on the target dP valve outlet pressure. At 444, the controller 156 determines the target dP valve position based on the target dP valve delta pressure. At 448, the controller 156 controls the dP valve 110 based on the target dP valve position. This includes closed-loop adjustment of the target dP valve position at 456 based on a difference or error between the measured dP valve outlet pressure and the target dP valve outlet pressure, which is compared to a threshold at 452. When the error satisfies the threshold, the method 400 ends or returns to 404.

Gas Pressure Adaptation

Referring now to FIGS. 5A-5F, functional block diagrams of example gas pressure adaptation architectures are illustrated. In one exemplary implementation, these architectures are implemented in the controller 156.

Figure 5A:
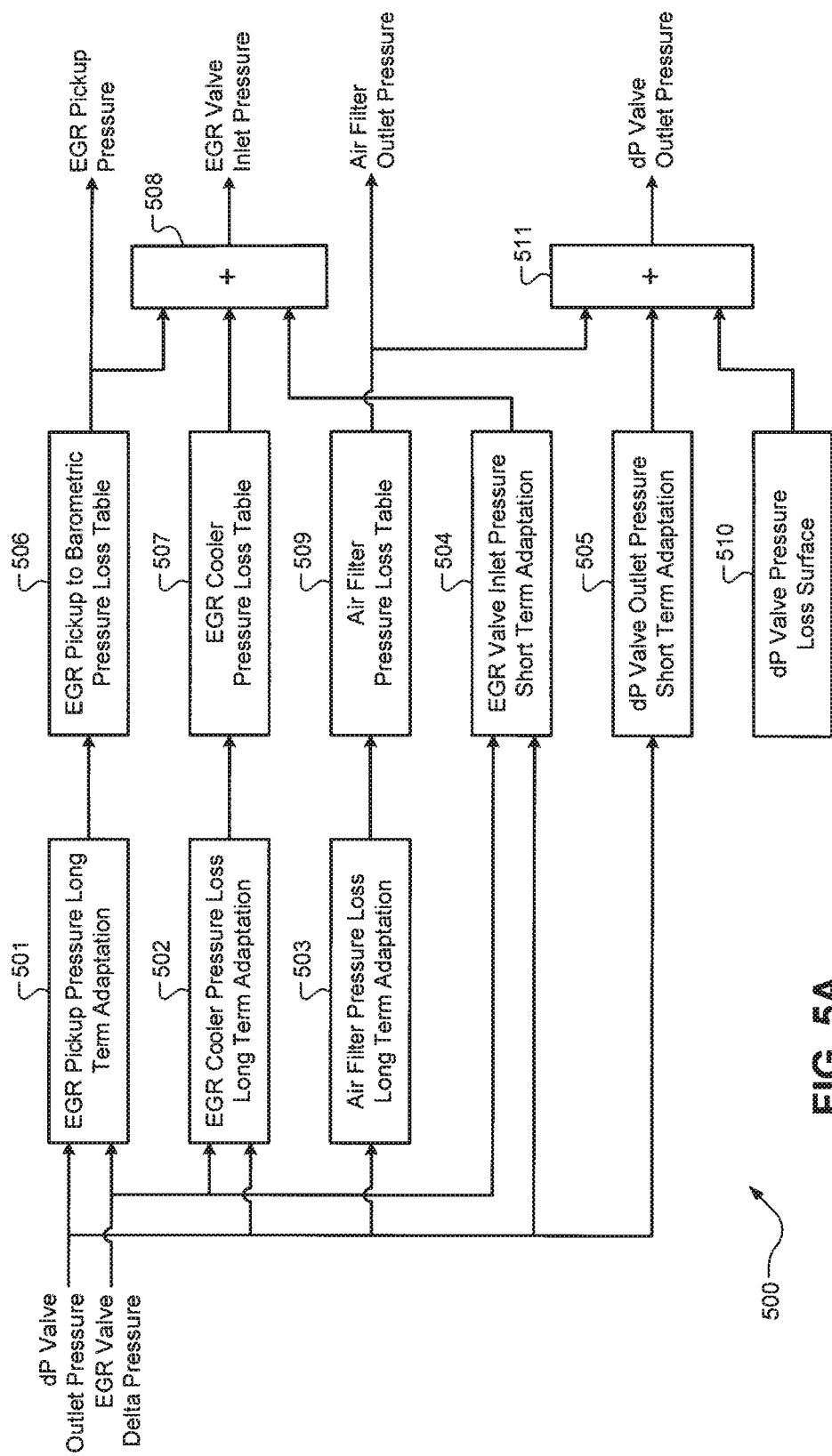

FIG. 5A illustrates a high-level gas pressure adaptation architecture 500. This architecture includes both long term and short term adaptations. The long term adaptations involve accumulating error throughout a life of the vehicle to determine a multiplier that is utilized for correction. For example, the catalytic converter 152 ages over time, which affects exhaust gas pressure. Similarly, for example, the air filter 108 fills or clogs with filtered matter, which affects induction air pressure. Short term adaptation, on the other hand, is performed for points that are directly associated with a sensor and thus are able to be adjusted in the short term based on sensor feedback. An EGR pickup pressure long term adaptation block 501 and an EGR cooler pressure loss long term adaptation block 502 each receive both the measured dP valve outlet pressure (from sensor 162) and the measured EGR valve delta pressure (from sensor 160). An air filter pressure loss long term adaptation block 503 only receives the measured dP valve outlet pressure. An EGR valve inlet pressure short term adaptation block 504 receives both the measured dP valve outlet pressure and the EGR valve delta pressure. A dP valve outlet pressure short term adaptation block 505 only receives the measured dP valve outlet pressure.

Block 501 calculates and outputs an EGR pickup pressure multiplier. This multiplier is applied to an EGR pickup pressure loss obtained from a calibrated EGR pickup pressure to barometric pressure loss table 506 to obtain the modeled EGR pickup pressure. Block 502 calculates and outputs an EGR cooler pressure multiplier. This multiplier is applied to an EGR cooler pressure loss obtained from a calibrated EGR cooler pressure loss table 507 to obtain the modeled EGR cooler outlet pressure. Block 504 calculates and outputs a short term correction for the EGR valve inlet pressure, which is summed with the modeled EGR cooler outlet pressure loss and the modeled EGR pickup pressure loss at block 508 to obtain the modeled EGR valve inlet pressure. Modeled EGR valve outlet pressure is then obtained from the modeled EGR valve inlet pressure using the measured EGR valve delta pressure. Block 503 calculates and outputs an air filter pressure multiplier. This multiplier is applied to an air filter pressure loss obtained from a calibrated air filter pressure loss table 509 to obtain the modeled air filter outlet pressure. Block 505 calculates and outputs a short term correction for the dP valve outlet pressure. A calibrated dP valve pressure loss surface 510 is utilized to obtain a dP valve pressure loss. The outputs of blocks 504, 505, and 510 are summed at block 511 to obtain the modeled dP valve outlet pressure.

Figure 5B:
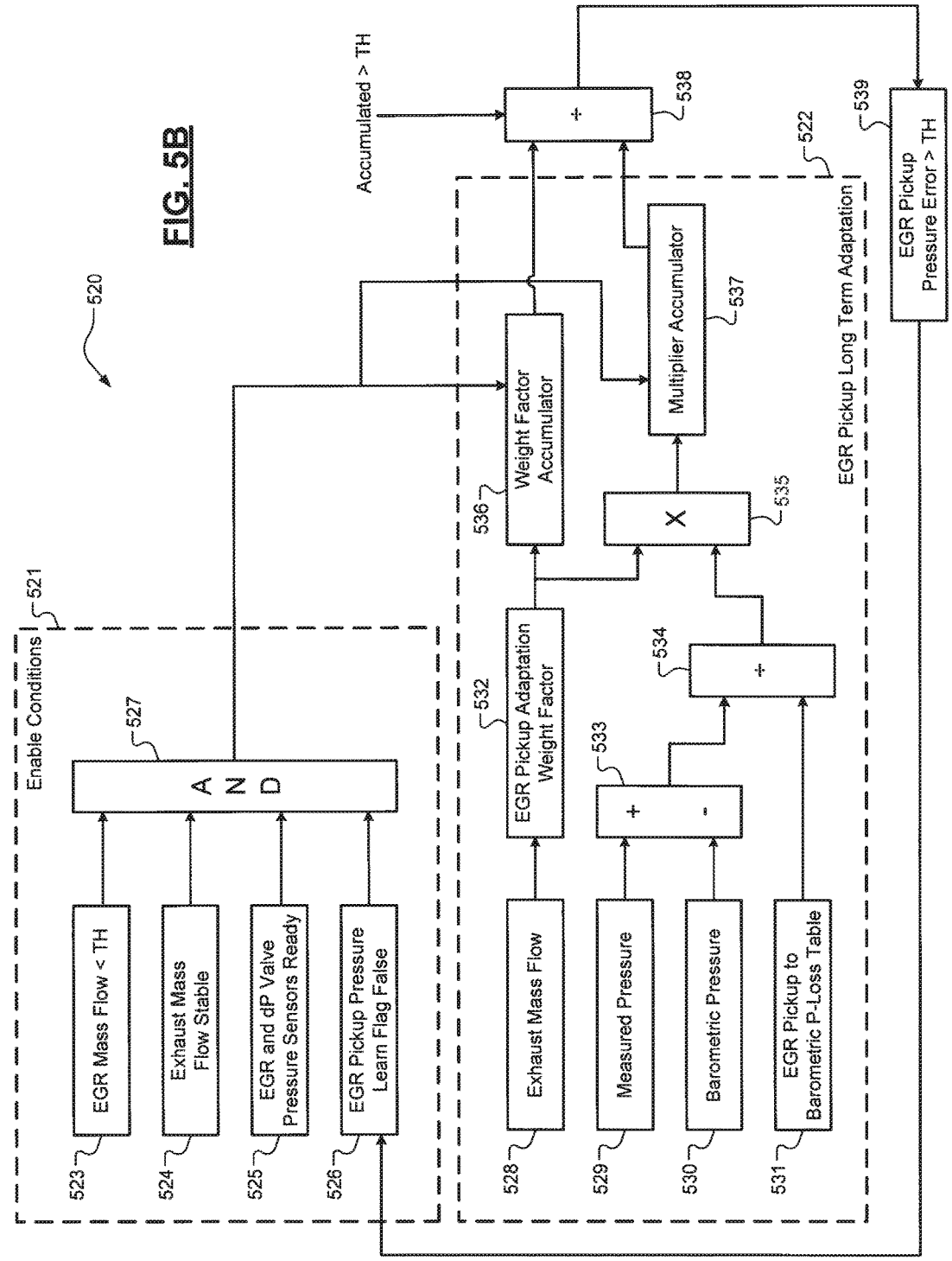

FIG. 5B illustrates an example architecture 520 for the EGR pickup pressure long term adaptation block 501. The architecture 520 is generally divided into enable conditions block 521 and the actual EGR pickup long term adaption block 522. The enable conditions 521 block includes EGR mass flow being below a certain threshold at block 523, the exhaust mass flow being stable (e.g., remaining within a certain range) at block 524, the EGR valve delta pressure and dP valve outlet pressure sensors 160, 162 being ready for measurement (e.g., no faults/malfunctions) at block 525, and the EGR pickup pressure learn complete flag being false (e.g., a learn has not already been performed or the modeled pressure is larger than a threshold such that a relearn process is enabled) at block 526. When all of these enable conditions are satisfied at block 527, a trigger signal is output to the EGR pickup long term adaptation block 522. Parameters utilized in the EGR pickup long term adaptation block 522 include exhaust mass flow 528, measured pressures 529 from sensors 160, 162, barometric pressure 530, and an EGR pickup to barometric pressure loss (P-Loss) table 531. An EGR pickup adaptation weight factor block 532 calculates and outputs an EGR pickup adaptation weight factor based on the exhaust mass flow 528. In one exemplary implementation, higher exhaust gas pressures are given a higher weight factor as they are considered more reliable.

A difference block 533 calculates and outputs a difference between the measured exhaust gas and barometric pressures 529, 530. Block 534 calculates a ratio or quotient of the output of block 533 and the EGR pickup to barometric pressure loss from table 531. The output of block 534 is multiplied by the EGR pickup adaptation weight factor (from block 532) at block 535 to obtain an EGR pickup pressure multiplier. The EGR pickup adaptation weight factor is also accumulated at block 536 while the trigger signal is output from the enable conditions block 521. Similarly, the EGR pickup pressure multiplier is also accumulated at block 537 while the trigger signal is output from the enable conditions block 521. When the quantity of accumulation exceeds a threshold (e.g., a minimum number of samples), block 538 calculates and outputs a ratio or quotient of the accumulated EGR pickup adaptation weight factor and the accumulated EGR pickup pressure multiplier. The output of block 538 is the final EGR pickup pressure multiplier. Provided this final EGR pickup pressure multiplier results in the modeled EGR pickup pressure being within an accuracy or error threshold, the EGR pickup long term adaptation is complete. Alternatively, if the requisite accuracy is not achieved, the EGR pickup pressure learn complete flag remains false and the learning process continues. For example, this flag could be flipped from true to false when the system changes and the modeled pressure becomes inaccurate (e.g., exceeding a threshold), and thus a relearn process would be enabled.

Figure 5C:
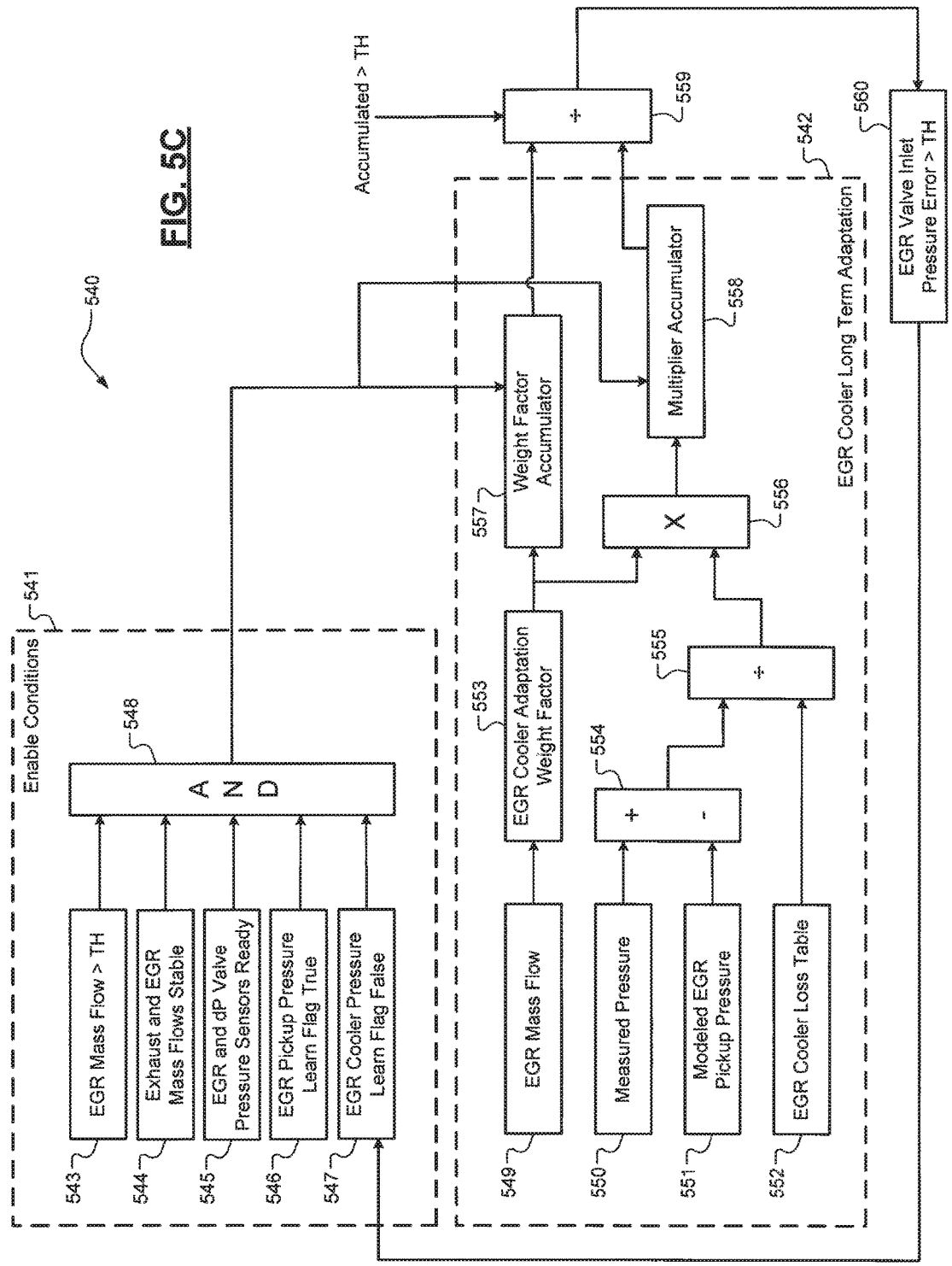

FIG. 5C illustrates an example architecture 540 for the EGR cooler pressure long term adaptation block 502. The architecture 540 is generally divided into enable conditions block 541 and the actual EGR cooler long term adaption block 542. The enable conditions 541 block includes EGR mass flow being above a certain threshold at block 543, the exhaust and EGR mass flows being stable (e.g., remaining within certain ranges) at block 544, the EGR valve delta pressure and dP valve outlet pressure sensors 160, 162 being ready for measurement (e.g., no faults/malfunctions) at block 545, the EGR pickup pressure learn flag being true (see FIG. 5B and above) at block 546, and the EGR cooler pressure learn complete flag being false (e.g., a learn has not already been performed or the modeled pressure is larger than a threshold such that a relearn process is enabled) at block 547. When all of these enable conditions are satisfied at block 548, a trigger signal is output to the EGR cooler long term adaptation block 542. Parameters utilized in the EGR cooler long term adaptation block 542 include EGR mass flow 549, measured pressures 550 from sensors 160, 162, the modeled EGR pickup pressure 551, and an EGR cooler loss table 552. An EGR cooler adaptation weight factor block 553 calculates and outputs an EGR cooler adaptation weight factor based on the EGR mass flow 549.

In one exemplary implementation, higher EGR pressures are given a higher weight factor as they are considered more reliable. A difference block 554 calculates and outputs a difference between the measured EGR valve inlet and modeled EGR pickup pressures 550, 551.

Block 555 calculates a ratio or quotient of the output of block 554 and the EGR cooler pressure loss from table 552. The output of block 555 is multiplied by the EGR cooler adaptation weight factor (from block 553) at block 556 to obtain an EGR cooler pressure multiplier. The EGR cooler adaptation weight factor is also accumulated at block 557 while the trigger signal is output from the enable conditions block 541. Similarly, the EGR cooler pressure multiplier is also accumulated at block 558 while the trigger signal is output from the enable conditions block 541. When the quantity of accumulation exceeds a threshold (e.g., a minimum number of samples), block 559 calculates and outputs a ratio or quotient of the accumulated EGR cooler adaptation weight factor and the accumulated EGR cooler pressure multiplier. The output of block 559 is the final EGR cooler pressure multiplier. Provided this final EGR cooler pressure multiplier results in the modeled EGR cooler pressure being within an accuracy or error threshold, the EGR cooler long term adaptation is complete. Alternatively, if the requisite accuracy is not achieved, the EGR cooler pressure learn complete flag remains false and the learning process continues. For example, this flag could be flipped from true to false when the system changes and the modeled pressure becomes inaccurate (e.g., exceeding a threshold), and thus a relearn process would be enabled.

Figure 5D:
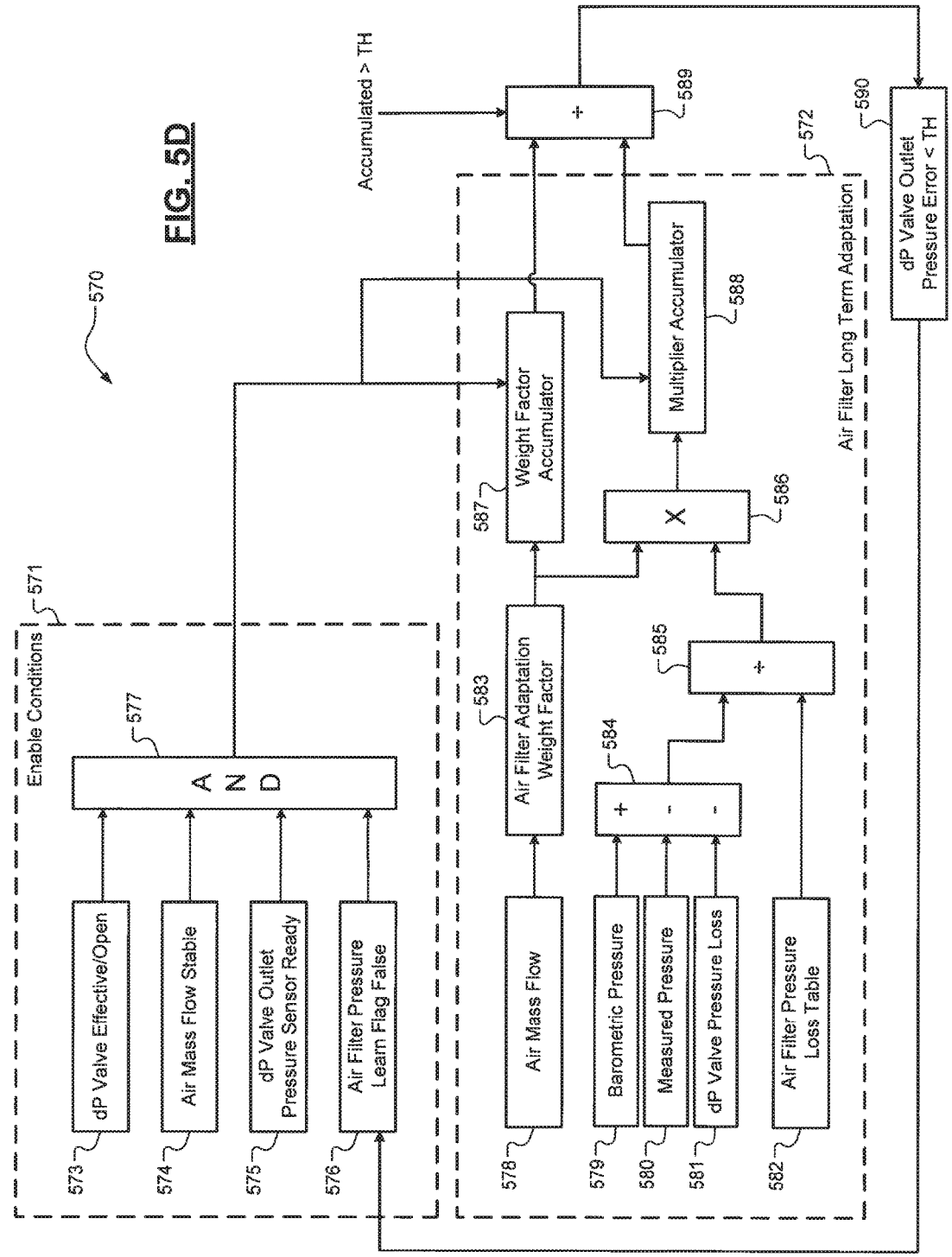

FIG. 5D illustrates an example architecture 570 for the air filter pressure loss long term adaptation block 503. The architecture 570 is generally divided into enable conditions block 571 and the actual air filter long term adaption block 572. The enable conditions 571 block includes the dP valve 110 being effective/open (e.g., not closed or malfunctioning) at block 573, the air mass flow being stable (e.g., remaining within a certain range) at block 574, the dP valve outlet pressure sensors 162 being ready for measurement (e.g., no faults/malfunctions) at block 575, and the air filter pressure learn complete flag being false (e.g., a learn has not already been performed or the modeled pressure is larger than a threshold such that a relearn process is enabled) at block 576. When all of these enable conditions are satisfied at block 577, a trigger signal is output to the air filter long term adaptation block 572. Parameters utilized in the air filter long term adaptation block 572 include air mass flow 578, barometric pressure 579, measured pressure 580 from sensor 162, dP valve pressure loss 581, and an air filter pressure loss table 582. An air filter adaptation weight factor block 583 calculates and outputs an air filter adaptation weight factor based on the air mass flow 578. In one exemplary implementation, higher EGR pressures are given a higher weight factor as they are considered more reliable. A difference block 584 calculates and outputs a difference between the barometric pressure 579 and the measured air pressure and dP valve pressure loss 580, 581.

Block 585 calculates a ratio or quotient of the output of block 584 and the air filter pressure loss from table 582. The output of block 585 is multiplied by the air filter adaptation weight factor (from block 583) at block 586 to obtain an air filter pressure multiplier. The air filter adaptation weight factor is also accumulated at block 587 while the trigger signal is output from the enable conditions block 571. Similarly, the air filter pressure multiplier is also accumulated at block 588 while the trigger signal is output from the enable conditions block 571. When the quantity of accumulation exceeds a threshold (e.g., a minimum number of samples), block 589 calculates and outputs a ratio or quotient of the accumulated air filter adaptation weight factor and the accumulated air filter pressure multiplier. The output of block 589 is the final air filter pressure multiplier. Provided this final air filter pressure multiplier results in the modeled air filter outlet pressure being within an accuracy or error threshold, the air filter long term adaptation is complete. Alternatively, if the requisite accuracy is not achieved, the air filter pressure learn complete flag remains false and the learning process continues. For example, this flag could be flipped from true to false when the system changes and the modeled pressure becomes inaccurate (e.g., exceeding a threshold), and thus a relearn process would be enabled.

Figure 5E:
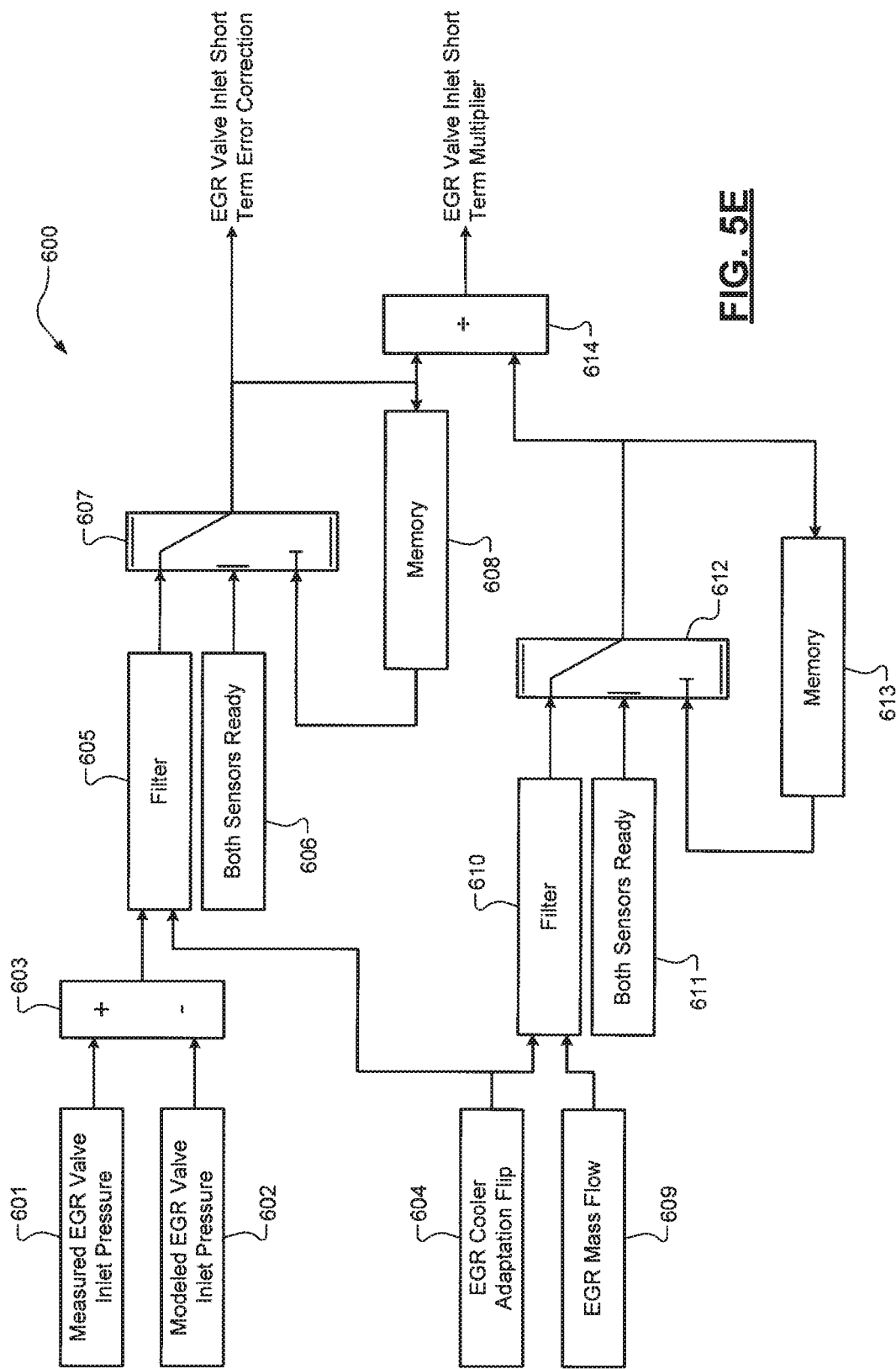
Figure 5E:
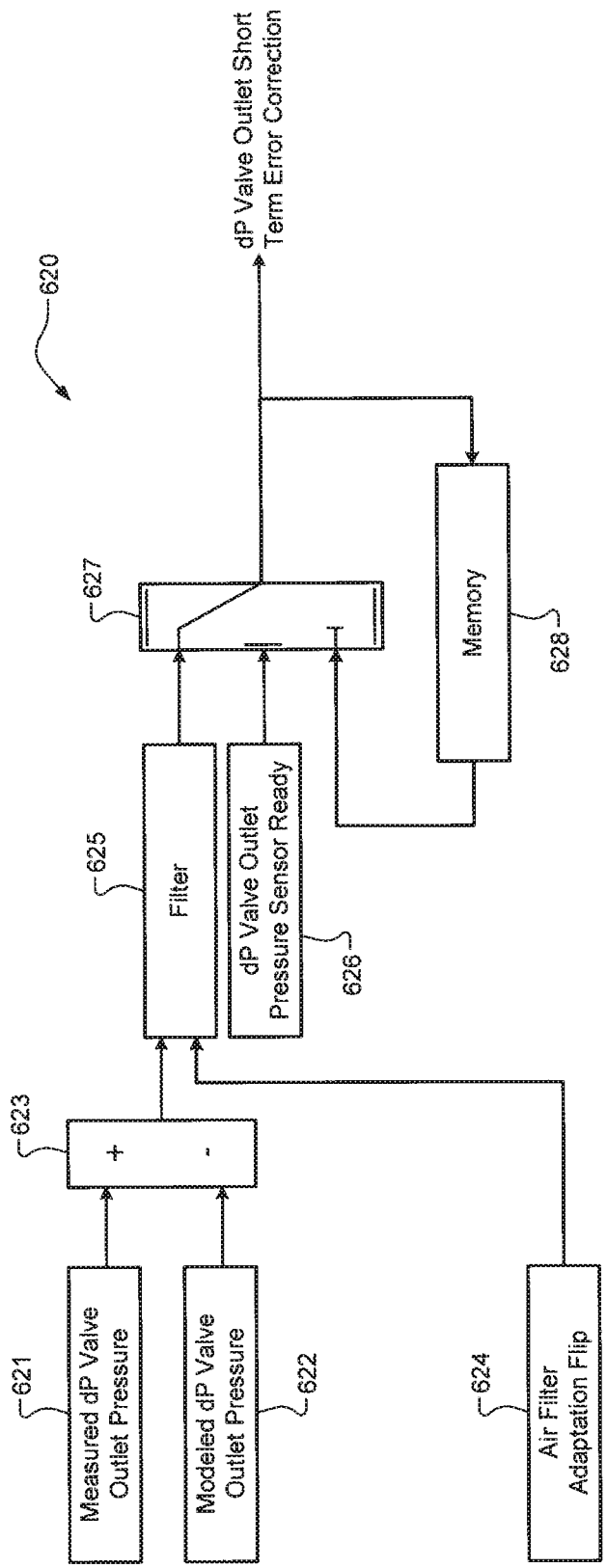

FIG. 5E illustrates an example architecture 600 for the EGR valve inlet pressure short term adaptation block 504. A difference is calculated between the measured and modeled EGR valve inlet pressures 601, 602 at block 603. This difference is filtered to remove noise and a filtered difference is output by block 605. If an EGR cooler adaptation learning is initiated, however, block 604 triggers a reset or temporary disable for the filter block 605. A latch 607 is enabled when both the EGR valve delta pressure and dP valve outlet pressure sensors 160, 162 are ready (e.g., no faults or malfunctions) per block 606. When enabled, the latch 607 passes the filtered difference as a short term correction value for the EGR valve inlet pressure. This filtered difference is also stored in memory 608. When the latch 607 is disabled (e.g., one of the sensors 160, 162 is not ready), the stored filtered difference is retrieved and passed by the latch 607 as the short term correction value for the EGR valve inlet pressure. The EGR mass flow 609 is also filtered to remove noise by filter block 610. Filter block 610 is similarly reset/disabled when the EGR cooler adaptation learning is initiated. Another latch 612 is enabled when both the sensors 160, 162 are ready per block 611. When enabled, the latch 612 passes the filtered EGR mass flow to block 614, which is also stored in memory 613. When the latch 612 is disabled, the stored filtered EGR mass flow is retrieved and passed by the latch 612 to block 614. Block 614 calculates a quotient or ratio of the filtered difference and the filtered EGR mass flow to obtain a short term multiplier for the EGR valve inlet pressure.

FIG. 5F illustrates an example architecture 620 for the dP valve outlet pressure short term adaptation block 505. A difference is calculated between the measured and modeled dP valve outlet pressures 621, 622 at block 623. This difference is filtered to remove noise at block 625. If an air filter adaptation learn is initiated, however, block 624 triggers a reset or temporary disable for the filter block 625. A latch 627 is enabled when the dP valve outlet pressure sensors 160 is ready (e.g., no faults or malfunctions) per block 626. When enabled, the latch 627 passes the filtered difference as a short term correction value for the dP valve outlet pressure. This filtered difference is also stored in memory 628. When the latch 627 is disabled (e.g., sensor 162 is not ready), the stored filtered difference is retrieved and passed by the latch 627 as the short term correction value for the dP valve outlet pressure.

Figure 6B:
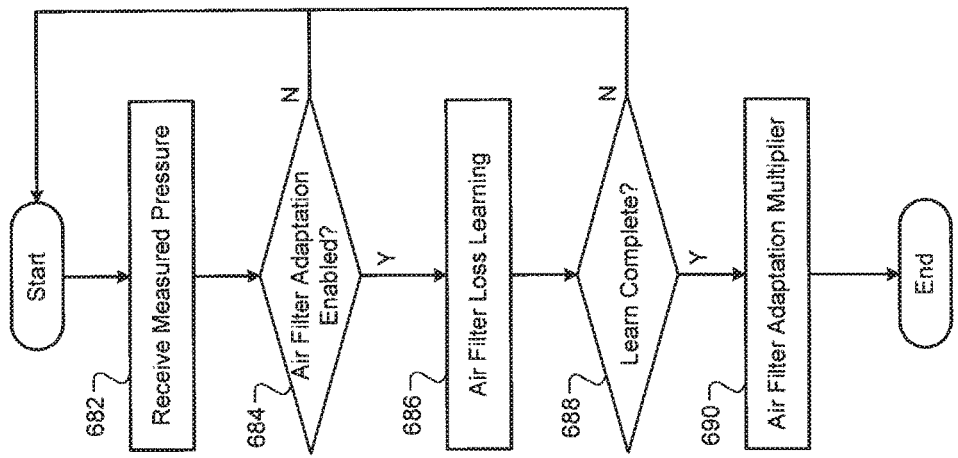
FIGS. 6A-6B are flow diagrams of example gas pressure adaptation methods according to the principles of the present disclosure.
Figure 6A:
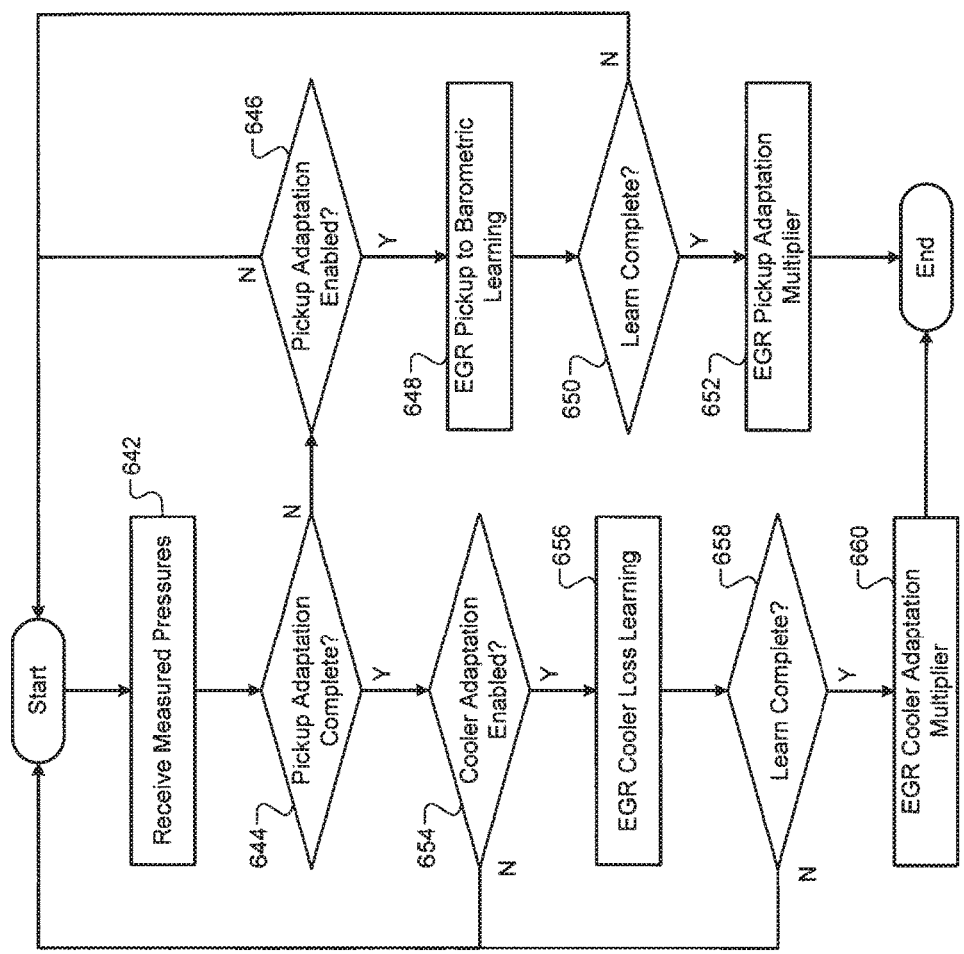

Referring now to FIGS. 6A-6B, flow diagrams of example methods 640, 680 of gas pressure adaptation is illustrated. It will be appreciated that these methods 640 could be executed or performed by the controller 156 simultaneously, partially overlapping, or entirely separately.

FIG. 6A illustrates a first example gas pressure adaptation method 640. At 642, the controller 156 receives the measured EGR valve delta pressure and the measured dP valve outlet pressure. At 644, the controller 156 determines whether the EGR pickup adaptation learning is complete. If true, the method 640 proceeds to 654. If false, the controller 156 determines whether the EGR pickup adaptation learning is enabled. If true, the method proceeds to 648. If false, the method 640 ends or returns to 642. At 648, the controller 156 performs the EGR pickup to barometric pressure loss learning until the learning is complete at 650. When the learning is complete, the EGR pickup adaptation multiplier is learned and used by the controller 156 at 652 and the method 640 ends or returns to 642 (e.g., to learn the EGR cooler adaptation). At 654, the controller 156 determines whether the EGR cooler adaptation learning is enabled. If true, the method 640 proceeds to 656. If false, the method 640 ends or returns to 642. At 656, the controller performs the EGR cooler pressure loss learning until the learning is complete at 658. When the learning is complete, the EGR cooler adaptation multiplier is learned and used by the controller 156 at 660 and the method 640 ends or returns to 642.

FIG. 6B illustrates a second example gas pressure adaptation method 680. At 682, the controller 156 receives the measured dP valve outlet pressure. At 684, the controller 156 determines whether the air filter loss adaptation learning is enabled. If true, the method 680 proceeds to 686. If false, the method 680 ends or returns to 682. At 686, the controller 156 performs the air filter loss adaption learning until the learning is complete at 688. When the learning is complete, the air filter adaptation multiplier is learned and used by the controller 156 at 690 and the method 680 ends or returns to 680.

Exhaust Gas Constituent Tracking

Figure 7A:
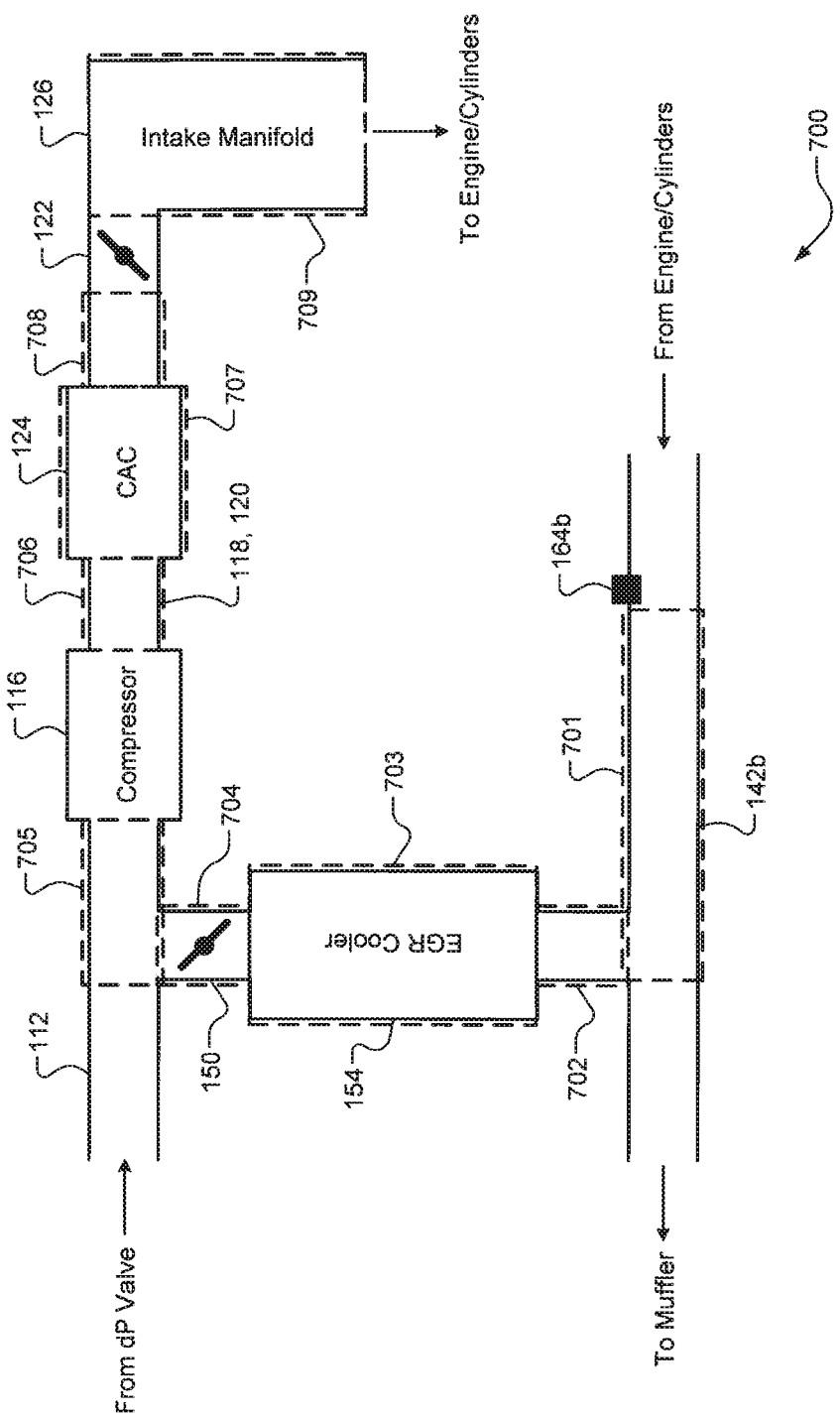
Figure 7B:
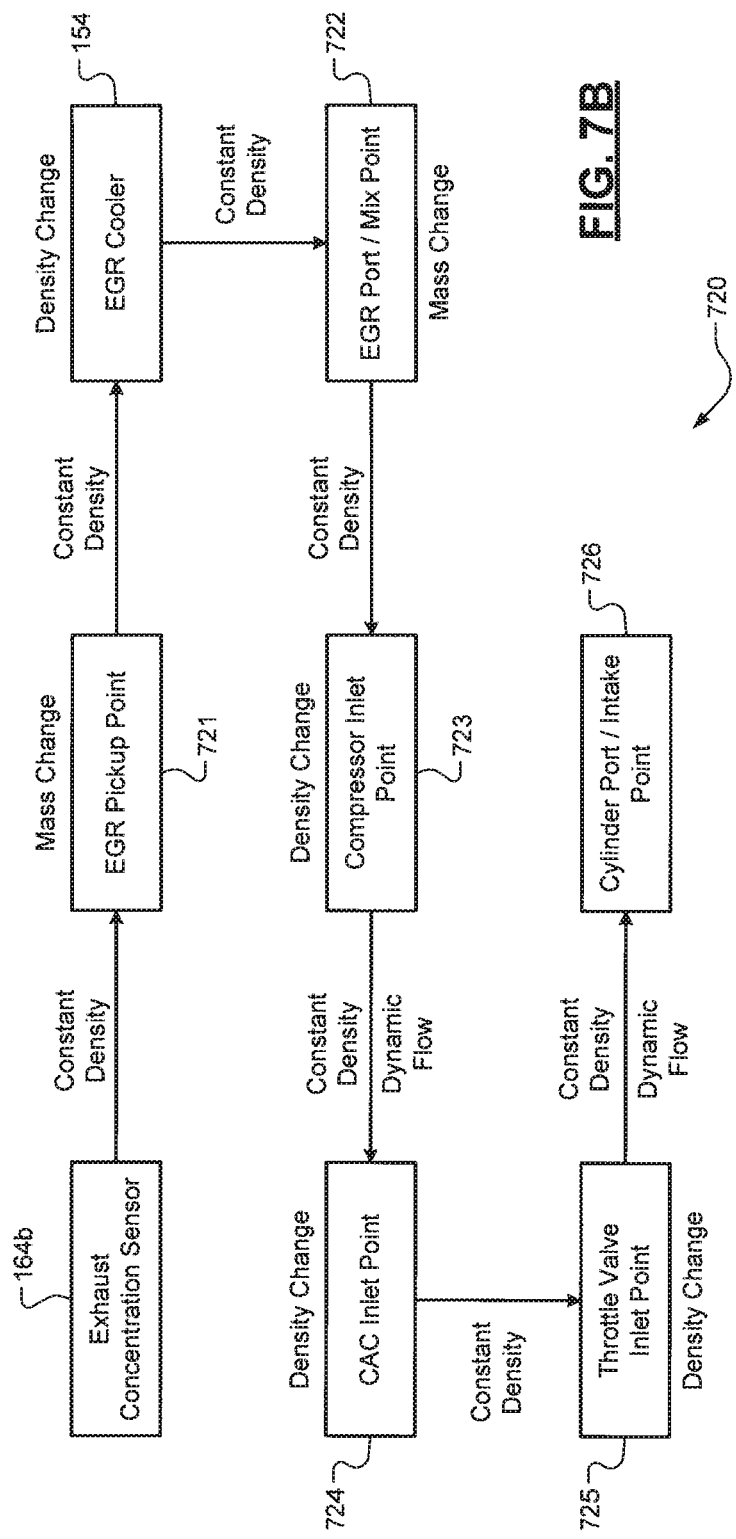

Referring now to FIGS. 7A-7B, diagrams of example exhaust gas constituent tracking features are illustrated. In one exemplary implementation, at least a portions of the architecture of FIG. 7B is implemented in the controller 156.

FIG. 7A illustrates an entire flow path 700 of EGR from the exhaust gas concentration sensor 164*b* to cylinders/an intake port of the engine 102. This flow path 700 includes a number of components. For example, these components could include the EGR cooler 154, the EGR valve 154, the compressor 116, the charge air cooler (CAC) 124, the throttle valve 122, and the intake manifold 126. In order to accurately track exhaust gas constituents (e.g., air, unburned mixture, inert gas, etc.), each portion of the flow path must be accurately modeled. These exhaust gas constituents can be calculated, for example, based on the FA of the exhaust gas. The flow path is generally divided into nine distinct regions: (1) region 701 from the exhaust gas concentration sensor 164*b* (e.g., a WRO2 sensor) to the EGR pickup point, (2) region 702 from the EGR pickup point to an inlet of the EGR cooler 154, (3) region 703 from the inlet of the EGR cooler 154 to an outlet of the EGR cooler 154, (4) region 704 from the outlet of the EGR cooler across the EGR valve 150 and to the EGR port or mixing point with air in the induction pipe 112, (5) region 705 from the EGR port to an inlet of the compressor(s) 116, (6) region 706 from the outlets of the compressor(s) 116 to the inlet of the CAC 124, (7) region 707 from the inlet of the CAC 124 to an outlet of the CAC 124, (8) region 708 from the outlet of the CAC 124 to an inlet of the throttle valve 122, and (9) region 709 from an outlet of the throttle valve 122 across the intake manifold 126 to the cylinders/intake port of the engine 102.

FIG. 7B illustrates an example architecture 720 for modeling the flow path 700 to accurately track the exhaust gas constituents throughout the flow path 700. More specifically, this architecture illustrates model assumptions regarding whether certain components are assumed to affect EGR mass and/or EGR density. In region 701 from the exhaust gas concentration sensor 164*b*, there is a constant exhaust gas density. However, at the EGR pickup point 721, there is a change in mass as not all of the exhaust gas is recirculated via the LPEGR system 146. The controller 156 accounts for this mass change. From the EGR pickup point 721 to the inlet of the EGR cooler 154, there is constant EGR density. However, across the EGR cooler 154, there is a change in EGR density that is accounted for by the controller 156. From the outlet of the EGR cooler 154 across the EGR valve 150 and to the EGR port or mixing point 722, there again is a constant density. However, at the EGR port or mixing point 722, there is a change in mass as the EGR is combined with air from the induction pipe(s) 112. The controller accounts for this mass change. From the EGR port 722 to a compressor inlet point 723, there is constant density. However, there is a density change across the compressor(s) 116 that is accounted for by the controller 156. From the compressor outlet point, there is constant density until the CAC inlet point. There are also flow dynamics from the compressor(s) 116 all the way to the CAC 124 to be accounted for by the controller 156. There is another density change from the CAC inlet point 724 and across the CAC 124 that is accounted for by the controller 156. While there is a constant density from the CAC 124 to the throttle valve 122 (or vice-versa), there is another density change from a throttle valve inlet point 725 and across the throttle valve 122, but there is constant density from the outlet of the throttle valve 122 and across the intake manifold 126 to the cylinder port or intake point of the engine 102. Again, the controller 156 accounts for flow dynamics through the intake manifold.

Referring now to FIGS. 7C-7D, example buffering features utilized by the controller 156 in performing the exhaust gas constituent tracking are illustrated. As discussed above and shown in FIG. 7C, changes in exhaust gas/EGR mass and density affect how exhaust gas constituents should be tracked. Each of the portions 701-709 of the flow path 700 can be modeled using a buffer 740 comprising a plurality of cells 742-1 ... 742-N (N=8 as shown). A total size 744 of the buffer 742 equals a size of each cell 742 times N. Each cell represents a portion of a particular path portion and the exhaust gas/EGR mass is able to be calculated based on the known hardware configuration and other parameters (temperature, pressure, volume, etc.). For example, the mass for a particular cell could be calculated by dividing (i) a product of the pressure (P) and volume (V) for the particular cell by (i) a produce of a gas constant (R) and the temperature (T) for the particular cell). Partial cells 748 can also be utilized as shown by incoming mass 746. These partial cells 748, however, may be loaded into the buffer 740 last (e.g., after the other three cells of incoming mass 746).

As shown in FIG. 7D, density changes affect buffer operation. When expansion/density decreases (flow out<flow in, e.g., at throttle tip-in), a portion of the exhaust gas/EGR mass is pushed out of the path portion. As shown, buffer 760*a* includes six cells 1-6. After a 50% expansion or density reduction, the data in the last three cells 4-6 is pushed out of the buffer (e.g., to a next buffer for a subsequent path portion) due to the decreased density and the remaining data in the first three cells 1-3 is spread across all six cells 1-6 as shown at 760*b*. The remaining exhaust gas/EGR mass is then divided across the buffer cells for that path portion. Conversely, when compression/density increases (flow in >flow out, e.g., at throttle tip-out), the exhaust gas/EGR mass is stored in a latter portion of the buffer cells and the former buffer cells are freed up to account for the incoming exhaust gas/EGR mass. As shown, buffer 780*a* includes six cells 1-6. After a 50% compression or density increase, the data in the six cells 1-6 is consolidated across the last three cells 4-6 (e.g., in six half-sized or partial cells) to make room in cells 1-3 for incoming exhaust gas/EGR caused by the increase density as shown at 780*b*. It will be appreciated that the 50% density changes illustrated and discussed above are examples values and the buffers could be manipulated in response to any suitable density changes.

Figure 8:
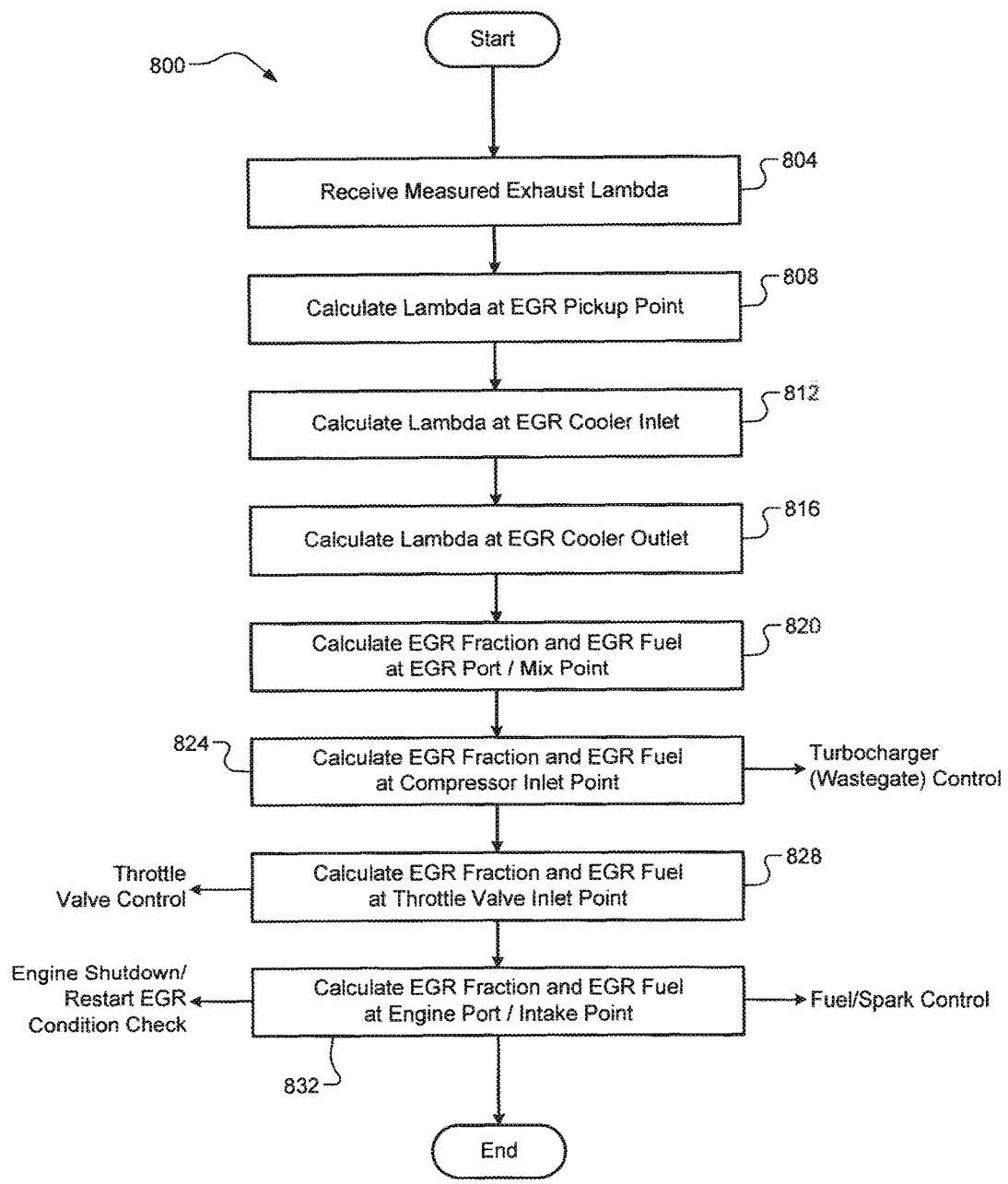
FIG. 8 is a flow diagram of an example method of tracking exhaust gas constituents through a low pressure EGR (LPEGR) and an induction system of a turbocharged engine of a vehicle according to the principles of the present disclosure.

Referring now to FIG. 8, a flow diagram of an example method 800 of exhaust gas constituent tracking through the LPEGR system 146 and the induction system 104 of the turbocharged engine 102 is illustrated. At 804, the controller 156 receives a measured exhaust air/fuel ratio (FA) or lambda. At 808, the controller 156 calculates the lambda at the EGR pickup point. At 812, the controller 156 calculates the lambda at the EGR cooler inlet point. At 816, the controller 156 calculates the lambda at the EGR cooler outlet point. At 820, the controller 156 calculates the EGR fraction and EGR fuel at the EGR port or mixing point. At 824, the controller 156 calculates the EGR fraction and EGR fuel at the compressor inlet point(s). These values are utilized by the controller 156 for turbocharger (e.g., wastegate valve) control. At 826, the controller 156 calculates the EGR fraction and EGR fuel at the throttle valve inlet point. These values are utilized by the controller 156 to control the throttle valve 122. At 832, the controller 156 calculates the EGR fraction and EGR fuel at the cylinder port or intake port of the engine 102. These values are utilized by the controller 156 in connection with an EGR check procedure in connection with engine shutdown and restart operations (e.g., accounting for any residual EGR in the intake manifold 126 during shutdown/restart). The method 800 then ends or returns to 804.

While the gas constituent tracking techniques discussed herein are described with respect to tracking exhaust gas constituents through an LPEGR system and an induction system of a turbocharged engine, it will be appreciated that these techniques could be applied to any system having a long gas flow path such that the gas constituents must be accurately tracked throughout the gas flow path to achieve precise system control.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle including a gasoline engine and a turbocharger, the system comprising:
   an exhaust gas recirculation (EGR) valve disposed in a low pressure EGR (LPEGR) system of the engine and configured to control a flow of exhaust gas produced by the engine from an exhaust system of the engine at a first point downstream from a turbine of the turbocharger to an induction system of the engine at a second point upstream from a compressor of the turbocharger and a throttle valve and downstream from an air filter;
   a differential pressure (dP) valve disposed in the induction system of the engine at a third point upstream from the second point and configured to control a flow of air through the induction system; and a controller configured to:
receive a set of parameters including a measured pressure delta across the EGR valve and a measured pressure at an outlet of the dP valve;
determine a set of modeled pressures based on the set of parameters, a target EGR valve mass flow, a target EGR valve delta pressure, a current dP valve mass flow, and a pressure at an outlet of the air filter;
determine target positions for the EGR valve and the dP valve based on the set of modeled pressures; and
control the EGR valve and the dP valve based on their respective target positions.

2. The control system of claim 1, wherein the controller is further configured to:
determine one of the set of modeled pressures including a modeled pressure at an inlet of the EGR valve based on the target EGR valve mass flow and the current dP valve mass flow, respectively;
determine a modeled pressure at an outlet of the EGR valve based on the modeled EGR valve inlet pressure and the measured EGR valve delta pressure;
determine an estimated open-loop EGR valve position based on the target EGR valve mass flow and the modeled EGR valve inlet and outlet pressures;
determine the target position for the EGR valve based on the estimated open-loop EGR valve position; and
control the EGR valve based on the target EGR valve position, the target EGR valve mass flow, and an estimated EGR valve mass flow.

3. The control system of claim 2, wherein the controller is configured to perform closed-loop control of the EGR valve by adjusting the target EGR valve position based on a difference between the estimated EGR valve mass flow and the target EGR valve mass flow.

4. The control system of claim 1, wherein the controller is further configured to:
determine a target dP valve outlet pressure based on hardware pressure limits, a measured barometric pressure from the set of parameters, a modeled EGR valve inlet pressure, and the target EGR valve delta pressure;
determine a target dP valve delta pressure based on a difference between the air filter outlet pressure and the target dP valve outlet pressure;
determine the target position for the dP valve based on the target dP valve delta pressure and the current dP valve mass flow; and
control the dP valve based on the target dP valve position, the target dP valve outlet pressure, and the measured dP valve outlet pressure.

5. The control system of claim 4, wherein the controller is configured to perform closed-loop control of the dP valve by adjusting the target dP valve position based on a difference between the measured dP valve outlet pressure and the target dP valve outlet pressure.

6. The control system of claim 1, wherein the controller is configured to determine the target EGR mass flow by:
determining a current EGR valve position;
determining an EGR valve mass flow rate based on the current EGR valve position, the measured EGR valve delta pressure, and the measured dP valve outlet pressure;
receiving a measured exhaust gas concentration, the measured exhaust gas concentration being one of the set of parameters; and
utilizing an EGR transport delay model, the EGR valve mass flow rate, and the measured exhaust gas concentration, determine an intake port fuel fraction and compressor inlet, throttle inlet, and intake port EGR fractions.

7. The control system of claim 6, wherein the controller is further configured to control the engine based on the intake port fuel fraction and the compressor inlet, throttle inlet, and intake port EGR fractions.

8. The control system of claim 1, wherein the set of modeled pressures include an EGR pickup pressure at the first point, a pressure at an inlet of the EGR valve, and the air filter outlet pressure, and wherein the controller is further configured to perform long term adaptation to the modeled EGR pickup pressure, both short term and long term adaptation to the EGR valve inlet pressure, long term adaptation to the air filter outlet pressure, and short term adaptation to the measured dP valve outlet pressure.

9. The control system of claim 1, wherein the engine further comprises:
the turbochargers including first and second turbochargers having (i) first and second compressors each disposed downstream from the dP valve and a dP valve outlet pressure sensor, the throttle valve being disposed downstream from the first and second compressors, and (ii) first and second turbines configured to drive the first and second compressors, respectively, using the exhaust gas;
a first exhaust treatment system disposed downstream from the first turbine;
a second exhaust treatment system disposed downstream from the second turbine, the second exhaust treatment system comprising a catalytic converter and an exhaust gas concentration sensor;
an EGR cooler in the LPEGR system disposed downstream from the catalytic converter and upstream from the EGR valve, the EGR cooler being configured to cool the exhaust gas, and
an EGR pressure delta sensor in the LPEGR system disposed proximate to the EGR valve and configured to measure the EGR valve delta pressure.

10. A gasoline engine system for a vehicle, the system comprising:
an induction system configured to provide air to an engine, the induction system comprising:
an air filter and a differential pressure (dP) valve disposed downstream from the air filter,
a dP outlet pressure sensor disposed at an outlet of the dP valve,
first and second compressors disposed downstream from the dP valve and the dP outlet pressure sensor,
a throttle valve disposed downstream from the first and second compressors;
an exhaust system configured to receive exhaust gas produced by the engine, the exhaust system comprising:
first and second turbines configured to drive the first and second compressors, respectively, using the exhaust gas,
a first exhaust treatment system disposed downstream from the first turbine,
a second exhaust treatment system disposed downstream from the second turbine, the second exhaust treatment system comprising a catalytic converter and an exhaust gas concentration sensor, and a low pressure exhaust gas recirculation (LPEGR) system configured to recirculate the exhaust gas to the induction system, the LPEGR system comprising:
  an EGR cooler disposed downstream from the catalytic converter and configured to cool the exhaust gas,
  an EGR valve configured to control recirculation of the cooled exhaust gas from the EGR cooler to a point upstream from the first and second compressors and downstream from the dP valve and the dP valve outlet pressure sensor, and
  an EGR pressure delta sensor disposed proximate to the EGR valve and configured to measure a delta pressure across the EGR valve; and
a controller comprising a barometric pressure sensor configured to measure barometric pressure, the controller being configured to:
  receive, from the EGR pressure delta sensor, the measured pressure delta across the EGR valve,
  receive, from the dP outlet pressure sensor, the measured pressure at the outlet of the dP valve,
  determine a set of modeled pressures based on (i) a set of parameters including the measured EGR valve pressure delta the measured dP valve outlet pressure, (ii) a target EGR valve mass flow, (iii) a target EGR valve delta pressure, (iv) a current dP valve mass flow, and (v) a pressure at an outlet of the air filter,
  determine target positions for the EGR valve and the dP valve based on the set of modeled pressures, and
  control the EGR valve and the dP valve based on their respective target positions.

11. The system of claim 10, wherein the controller is further configured to:
  determine one of the set of modeled pressures including a modeled pressure at an inlet of the EGR valve based on the target EGR valve mass flow and the current dP valve mass flow, respectively;
  determine a modeled pressure at an outlet of the EGR valve based on the modeled EGR valve inlet pressure and the measured EGR valve delta pressure;
  determine an estimated open-loop EGR valve position based on the target EGR valve mass flow and the modeled EGR valve inlet and outlet pressures;
  determine the target position for the EGR valve based on the estimated open-loop EGR valve position; and
  control the EGR valve based on the target EGR valve position, the target EGR valve mass flow, and an estimated EGR valve mass flow.

12. The system of claim 11, wherein the controller is configured to perform closed-loop control of the EGR valve by adjusting the target EGR valve position based on a difference between the estimated EGR valve mass flow and the target EGR valve mass flow.

13. The system of claim 10, wherein the controller is further configured to:
  determine a target dP valve outlet pressure based on hardware pressure limits, the measured barometric pressure, a modeled EGR valve inlet pressure, and the target EGR valve delta pressure, the measured barometric pressure being one of the set of parameters;
  determine a target dP valve delta pressure based on a difference between the air filter outlet pressure and the target dP valve outlet pressure;
  determine the target position for the dP valve based on the target dP valve delta pressure and the current dP valve mass flow; and
  control the dP valve based on the target dP valve position, the target dP valve outlet pressure, and the measured dP valve outlet pressure.

14. The system of claim 13, wherein the controller is configured to perform closed-loop control of the dP valve by adjusting the target dP valve position based on a difference between the measured dP valve outlet pressure and the target dP valve outlet pressure.

15. The system of claim 10, wherein the controller is configured to determine the target EGR mass flow by:
  determining a current EGR valve position;
  determining an EGR valve mass flow rate based on the current EGR valve position, the measured EGR valve delta pressure, and the measured dP valve outlet pressure;
  receiving, from the exhaust gas concentration sensor, the measured exhaust gas concentration, the measured exhaust gas concentration being one of the set of parameters; and
  utilizing an EGR transport delay model, the EGR valve mass flow rate, and the measured exhaust gas concentration, determining an intake port fuel fraction and compressor inlet, throttle inlet, and intake port EGR fractions.

16. The system of claim 15, wherein the controller is further configured to control the engine based on the intake port fuel fraction and the compressor inlet, throttle inlet, and intake port EGR fractions.

17. The system of claim 10, wherein the set of modeled pressures include an EGR pickup pressure before the EGR cooler, a pressure at an inlet of the EGR valve, and the air filter outlet pressure.

18. The system of claim 17, wherein the controller is further configured to perform long term adaptation to the modeled EGR pickup pressure, both short term and long term adaptation to the EGR valve inlet pressure, long term adaptation to the air filter outlet pressure, and short term adaptation to the measured dP valve outlet pressure.

* * * * *